United States Patent
Yao et al.

(10) Patent No.: US 11,425,588 B2
(45) Date of Patent: Aug. 23, 2022

(54) DATA PROCESSING METHOD AND RELATED DEVICE

(71) Applicant: Huawei Technologies Co., Ltd., Shenzhen (CN)

(72) Inventors: Chuting Yao, Beijing (CN); Yiru Kuang, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/961,486

(22) PCT Filed: Jan. 10, 2019

(86) PCT No.: PCT/CN2019/071199
§ 371 (c)(1),
(2) Date: Jul. 10, 2020

(87) PCT Pub. No.: WO2019/137443
PCT Pub. Date: Jul. 18, 2019

(65) Prior Publication Data
US 2020/0382982 A1 Dec. 3, 2020

(30) Foreign Application Priority Data

Jan. 12, 2018 (CN) .......................... 201810032554.8
Feb. 5, 2018 (CN) .......................... 201810109641.9

(51) Int. Cl.
*H04W 24/10* (2009.01)
*H04L 45/02* (2022.01)
*H04L 45/48* (2022.01)
*H04W 84/18* (2009.01)

(52) U.S. Cl.
CPC ............. *H04W 24/10* (2013.01); *H04L 45/02* (2013.01); *H04L 45/48* (2013.01); *H04W 84/18* (2013.01)

(58) Field of Classification Search
CPC ...... H04B 7/024; H04B 7/14; H04B 7/15592; H04W 36/0016; H04W 36/0055; H04W 36/0069; H04W 36/02; H04W 36/023
See application file for complete search history.

(56) References Cited

U.S. PATENT DOCUMENTS

| | | |
|---|---|---|
| 2009/0003378 A1 | 1/2009 | Sachs |
| 2010/0322194 A1 | 12/2010 | Hu et al. |
| 2010/0322197 A1 | 12/2010 | Adjakple et al. |
| 2011/0080891 A1* | 4/2011 | Cai ................... H04W 36/0033 370/331 |

(Continued)

FOREIGN PATENT DOCUMENTS

| | | |
|---|---|---|
| CN | 2696250 Y | 4/2005 |
| CN | 1949925 A | 4/2007 |

(Continued)

*Primary Examiner* — Pao Sinkantarakorn
(74) *Attorney, Agent, or Firm* — Slater Matsil, LLP

(57) ABSTRACT

A data processing method, including determining, by a second device, in response to a first device switching from the second device to a third device, data receiving status information of the first device, and reporting, by the second device, the data receiving status information of the first device, where the data receiving status information instructs a fourth device to send data to the first device according to the data receiving status information.

15 Claims, 18 Drawing Sheets

(56) References Cited

U.S. PATENT DOCUMENTS

| | | | |
|---|---|---|---|
| 2012/0257509 A1 | 10/2012 | Natarajan et al. | |
| 2014/0056243 A1* | 2/2014 | Pelletier | H04W 72/1263 370/329 |
| 2016/0212661 A1* | 7/2016 | Basu Mallick | H04L 1/1614 |
| 2018/0049261 A1* | 2/2018 | Tenny | H04W 76/15 |

FOREIGN PATENT DOCUMENTS

| | | |
|---|---|---|
| CN | 101651527 A | 2/2010 |
| CN | 102598774 A | 7/2012 |
| WO | 2010142082 A1 | 12/2010 |

\* cited by examiner

DATA PROCESSING METHOD AND RELATED DEVICE

CROSS REFERENCE TO RELATED APPLICATIONS

This application is a national stage of International Application No. PCT/CN2019/071199, filed on Jan. 10, 2019, which claims priority to Chinese Patent Application No. 201810109641.9, filed on Feb. 5, 2018 and Chinese Patent Application No. 201810032554.8, filed on Jan. 12, 2018. All of the aforementioned patent applications are hereby incorporated by reference in their entireties.

TECHNICAL FIELD

This application relates to the field of communications technologies, and in particular, to a data processing method and a related device.

BACKGROUND

A 5th Generation (5G) new radio (NR) technology can provide a bandwidth larger than that provided by a long term evolution (LTE) technology. To ensure deployment and application of a future cellular network, an integrated access and backhaul (JAB) technology may be used, and this technology can provide deployment of denser and more flexible NR cells, without causing a large-scale increase of transport networks. FIG. 1 is a possible structural diagram of an JAB network. As shown in FIG. 1, a donor base station may be directly connected to a core network, and may be connected to a plurality of relay nodes (RN). A relay node may be connected to another relay node. Herein the relay node may be a form of a base station. A link between base stations is referred to as a backhaul link. For example, a link between a donor base station and a relay node, and a link between relay nodes may be both referred to as backhaul links. User equipment (UE) may be connected to a donor base station or a relay node. A direct connection between the user equipment and the donor base station is a one-hop link. The user equipment may also be connected to the donor base station by using one or more relay nodes, and the connection is a multi-hop link. A link between the user equipment and the base station is referred to as an access link. For example, a link between the donor base station and the user equipment and a link between the relay node and the user equipment may be both referred to as access links.

Because multiple hops or multiple connections exist in a network structure of the JAB technology, when link quality of a backhaul link deteriorates, a relay node whose link breaks needs to switch from a source node to a destination node to ensure quality of communication, or when link quality of an access link deteriorates, the user equipment needs to switch from a source node to a destination node to ensure quality of communication. In this case, how to ensure that data of the user equipment is not lost is a problem urgently to be resolved.

SUMMARY OF THE INVENTION

This application provides a data processing method and a related device to help ensure that a data packet transmitted by user equipment is not lost.

According to a first aspect, this application provides a data processing method. A network structure to which the data processing method is applicable may include a first device, a second device, a third device, a fourth device, and a fifth device. When quality of a link between the first device and the second device deteriorates, the first device may switch from the second device to the third device. The fourth device is connected to a core network device. The second device and the third device are respectively connected to the core network device by the fourth device. The fifth device is any device on a link between the second device and the fourth device. All of the first device to the fifth device may be network devices. The first device may also be a terminal device. In this aspect, when the first device switches from the second device to the third device, the second device may report data receiving status information of the first device. Therefore, when receiving the data receiving status information, the fourth device can know a data receiving status of the first device, for example, data that has been sent by the fourth device to the first device but has not been acknowledged as received by the first device. Therefore, the fourth device can retransmit the data to the first device. As can be learned, in this aspect, in the data processing method, because a source node to which the first device is connected before switching sends a report, a data loss during switching can be avoided, in addition, because the source node sends the report, when the switching device is a relay node, a quantity of feedback reports can be reduced and air interface overheads can be reduced.

In a possible implementation, based on the network structure, when the first device switches from the second device to the third device, the second device determines the data receiving status information of the first device, the second device reports the data receiving status information of the first device, and the fourth device sends data to the first device based on the data receiving status information. To be specific, the data receiving status information is used to indicate information about data that has been received by the second device but has not been acknowledged as received by the first device, in data sent by the fourth device to the second device and sent by the second device to the first device or in data sent by the fourth device to the first device.

The fourth device is connected to the core network device, and the second device and the third device are respectively connected to the core network device by the fourth device. The fourth device may be a donor base station, the second device and the third device may be relay devices, for example, network devices such as relay base stations, and the first device may be a network device or may be a terminal device.

In a possible implementation, when at least one device exists on the link between the second device and the fourth device, that the second device reports the data receiving status information of the first device includes the second device sends a first status message to a parent node of the second device, so that the parent node of the second device reports the data receiving status information of the first device to the fourth device based on the first status message, where the first status message carries the data receiving status information of the first device, and the parent node of the second device is a device that is one-hop closer to the fourth device among devices that are directly connected to the second device.

In a possible implementation, that the second device sends a first status message to a parent node of the second device includes the second device sends the first status message to the parent node of the second device based on a maintained mapping relationship, where the mapping relationship of the second device is a correspondence between a data packet number of data sent by the second device to the first device and a data packet number of data received from the parent node of the second device.

In a possible implementation, when the at least one device existing on the link between the second device and the fourth device is the fifth device, the method further includes the fifth device receives a first status message sent by a child node of the fifth device, where the first status message carries the data receiving status information of the first device, and the fifth device sends a second status message to a parent node of the fifth device based on the first status message, where the second status message carries the data receiving status information of the first device, where the parent node of the fifth device is a device that is one-hop closer to the fourth device among devices that are directly connected to the fifth device, and the child node of the fifth device is a device that is one-hop farther from the fourth device among the devices that are directly connected to the fifth device.

In a possible implementation, that the fifth device sends a second status message to a parent node of the fifth device based on the first status message includes the fifth device sends the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

In a possible implementation, when the fourth device sends the data to the first device based on the data receiving status information, a priority of transmitting first data in the data by a device on a link between the fourth device and the first device is higher than a priority of transmitting second data in the data, the first data is the data that has been received by the second device but has not been acknowledged as received by the first device, in the data sent by the fourth device to the second device and sent by the second device to the first device or in the data sent by the fourth device to the first device, and the second data is downlink data sent by the fourth device to the first device after switching.

In another possible implementation, after the first device switches, the fourth device may not send the data to the first device until receiving the data receiving status information of the first device.

In a possible implementation, when the device on the link between the fourth device and the first device determines that received data is the first data, the received data needs to satisfy at least one of the following according to an identifier of a next hop indicated by the mapping relationship, a destination identifier carried in the received data is not an identifier of a child node of the third device sending the data, and a destination identifier carried in the received data is a destination identifier reachable based on the mapping relationship, and the received data is received from a first path, where the first path is not a path for receiving data of the first device by the third device. The first path is not a path for receiving data of the first device by the third device. Therefore, each device can confirm, based on the foregoing condition, whether data received by the device is data retransmitted by the fourth device or data forwarded by the second device.

In a possible implementation, because a device on a path for reporting the data receiving status information to the fourth device by the second device is the same as a device required for sending data to the second device by the fourth device before switching, when each device on the path receives a status message, the device may delete the previously received first data based on the data receiving status information in the status message.

In a possible implementation, the data receiving status information may be a Packet Data Convergence Protocol (PDCP) layer status report, the status report includes a number of a missed first data packet, and a receiving status of a subsequent data packet is indicated by using a bitmap, where 1 indicates "received", and 0 indicates "not received", or the status report includes a number of a missed data packet and a range of numbers of consecutive missed data packets.

In a possible implementation, the data receiving status information may be a Radio Link Control Protocol (RLC) layer status report, the status report includes a number of a missed first data packet, and a receiving status of a subsequent data packet is indicated by using a bitmap, where 1 indicates "received", and 0 indicates "not received", or the status report includes a number of a missed data packet and a range of numbers of consecutive missed data packets. When the status receiving information is the Radio Link Control Protocol (RLC) layer status report, a transmitting RLC entity and a corresponding receiving RLC entity need to maintain a hyper frame number, that is, maintain a variable of at least one bit apart from a sequence number of a transmitted data packet, to avoid that the status receiving information indicates a much earlier data packet.

In a possible implementation, in data sent by the fourth device to the first device through the second device, data not sent to the first device through the second device before switching is discarded by the second device, or is discarded by a device in which the data is located after switching.

In a possible implementation, the fourth device does not send data after the first device switches and before the fourth device receives the status receiving information.

In a possible implementation, that the second device reports the data receiving status information of the first device may include the second device sends a first status message to a parent node of the second device, where the first status message carries the data receiving status information of the first device, and the parent node of the second device is a device that is one-hop closer to the fourth device among devices that are directly connected to the second device.

The mapping relationship maintained by the second device is used by the second device to send the first status message to the parent node of the second device. The mapping relationship is a correspondence between a number of a data packet sent by the second device to the first device and a number of a data packet received from the parent node of the second device.

According to a second aspect, this application provides another data processing method. A network structure to which the data processing method is applicable may include a first device, a second device, a third device, a fourth device, a fifth device, and a sixth device. When quality of a link between the first device and the second device deteriorates, the first device may switch from the second device to the third device. The fourth device is connected to a core network device. The second device and the third device are respectively connected to the core network device by the fourth device. The fifth device is any device on a link between the second device and the fourth device. All of the first device to the fifth device may be network devices. The sixth device is directly connected to the first device or connected to the first device by at least one device. In this aspect, when the first device switches from the second device to the third device, the sixth device may be triggered to report data receiving status information. Therefore, the fourth device can know a data receiving status of the sixth device when receiving the data receiving status information, for example, information about data that has been sent by the fourth device to the sixth device but has not been acknowledged as received by the sixth device. Therefore, the fourth device can retransmit the data to the first device. As can be learned, in this aspect, in the data processing method, because a terminal device is triggered to report the data receiving status information, a data loss during switching is avoided.

In a possible implementation, the sixth device receives a first message, where the first message is used to instruct the sixth device to send data receiving status information to the fourth device, the sixth device determines the data receiving status information, the sixth device sends a status message to the fourth device through the first device, where the status message carries the data receiving status information of the sixth device, the fourth device receives the status message sent by the sixth device, where the status message carries the data receiving status information of the sixth device, and the fourth device sends data to the sixth device based on the data receiving status information of the sixth device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, when the first device switches from the second device to the third device, the fourth device sends the first message to the sixth device, where the first message is used to instruct the sixth device to send the data receiving status information to the fourth device.

The first message is sent in broadcast mode.

In a possible implementation, the first device sends the first message to the sixth device, where the first message is used to instruct the sixth device to send the data receiving status information to the fourth device.

The first message is sent in broadcast mode.

In a possible implementation, in data sent by the fourth device to the first device through the second device, data not sent to the first device through the second device before switching is discarded by the second device, or is discarded by a device in which the data is located after switching.

In a possible implementation, the fourth device does not send data after the first device switches and before the fourth device receives the status receiving information.

According to a third aspect, this application provides another data processing method. A network structure to which the data processing method is applicable may include a first device, a second device, a third device, a fourth device, and a fifth device. When quality of a link between the first device and the second device deteriorates, the first device may switch from the second device to the third device. The fourth device is connected to a core network device. The second device and the third device are respectively connected to the core network device by the fourth device. The fifth device is any device on a link between the second device and the fourth device. All of the first device to the fifth device may be network devices.

In another possible implementation, the first device may also be a terminal device. In this aspect, the second device may send, to the third device in a form of forwarding, data that has been received by the second device but has not been acknowledged as received by the first device, in data sent by the fourth device to the second device and sent by the second device to the first device, or in data sent by the fourth device to the first device, to avoid a loss of a data packet of the first device.

In a possible implementation, after the first device switches from the second device to the third device, the second device determines first data, the second device sends the first data to the third device, the third device determines that received data is the first data, and the third device sends the first data to the first device, where the first data is data that has been received by the second device but has not been acknowledged as received by the first device, in data sent by the fourth device to the first device through the second device, and the fourth device is connected to the core network device, and the second device and the third device are respectively connected to the core network device by the fourth device.

In a possible implementation, that the second device sends the first data to the third device includes the second device sends the first data to the third device based on a forwarding channel, where the forwarding channel is a channel from the second device to the third device, established by the fourth device by using signaling, and used to forward the first data.

In a possible implementation, after the first device switches from the second device to the third device, the fourth device establishes a data transmission channel between the fourth device and the third device by using signaling, and establishes a data forwarding channel from the second device to the third device by using signaling.

The fourth device establishes the data forwarding channel by performing signaling interaction with the second device and the third device. The fifth device maintains a mapping relationship. The fifth device is a device on a link between the second device and the third device, and the mapping relationship is a mapping relationship between a first channel between a parent node of the fifth device and the fifth device, and a second channel between the fifth device and a child node of the fifth device. The data carries a channel identifier, where the channel identifier is used to instruct a device receiving the data to transmit the data to a next-hop device based on the channel identifier.

In a possible implementation, when both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device, and the parent node of the seventh device is a device that is one-hop closer to the fourth device among devices that are directly connected to the seventh device.

In a possible implementation, by maintaining a same mapping relationship and/or a same channel identifier, the downlink channel of the data transmission channel and the data forwarding channel are the same between the parent node of the seventh device and the seventh device.

In a possible implementation, the parent node of the seventh device is a device that is passed through by both a link between the second device and the fourth device and a link between the third device and the fourth device.

In a possible implementation, when the second device is connected to the third device by at least one device, that the second device sends the first data to the third device based on a forwarding channel includes the second device sends the first data to a parent node or a child node of the second device based on the forwarding channel, and the parent node or the child node of the second device sends the first data to the third device, where the parent node of the second device is a device that is one-hop closer to the fourth device among devices that are directly connected to the second device, and the child node of the second device is a device that is one-hop farther from the fourth device among the devices that are directly connected to the second device.

In a possible implementation, that the second device sends the first data to the third device includes the second device sends the first data to the third device based on a mapping relationship, where the mapping relationship of the second device includes a destination identifier of a destination device that can be reached through the second device and an identifier of a next hop to the destination device.

In a possible implementation, the first data carries a first destination identifier, and the method further includes the second device updates the first destination identifier to a second destination identifier, and that the second device sends the first data to the third device based on a mapping relationship includes the second device sends the first data to the third device based on the second destination identifier and the mapping relationship.

In a possible implementation, that the second device sends the first data to the third device based on the second destination identifier and the mapping relationship includes when an identifier of a next hop to the second destination identifier exists in the mapping relationship of the second device, the second device sends the first data to a device identified by the next hop, so that the device identified by the next hop sends the first data to the third device, or when an identifier of a next hop to the second destination identifier does not exist in the mapping relationship of the second device, the second device sends the first data to a parent node of the second device, so that the parent node of the second device sends the first data to the third device, where the parent node of the second device is a device that is one-hop closer to the fourth device among devices that are directly connected to the second device.

In a possible implementation, that the second device updates the first destination identifier to a second destination identifier includes the second device adds an identifier of the third device to the first destination identifier to obtain the second destination identifier, or the second device changes the first destination identifier to an identifier of the third device to obtain the second destination identifier, or the second device adds a forwarding identifier to the first destination identifier to obtain the second destination identifier, where the forwarding identifier is used to indicate data forwarding.

In a possible implementation, the first data carries a first destination identifier, and that the second device sends the first data to the third device based on a mapping relationship includes the second device sends the first data to the third device based on the first destination identifier and the mapping relationship.

In a possible implementation, that the second device sends the first data to the third device based on the first destination identifier and the mapping relationship includes when an identifier of a next hop to the first destination identifier exists in the mapping relationship of the second device, the second device sends the first data to a device identified by the next hop, so that the device identified by the next hop sends the first data to the third device, or when an identifier of a next hop to the first destination identifier does not exist in the mapping relationship of the second device, the second device sends the first data to a parent node of the second device, so that the parent node of the second device sends the first data to the third device, where the parent node of the second device is a device that is one-hop closer to the fourth device among devices that are directly connected to the second device.

In a possible implementation, a priority of sending the first data by the second device is higher than a priority of sending second data by the second device, and the second data is downlink data sent by the fourth device to the first device after switching.

In a possible implementation, that the third device sends the first data to the first device includes the third device sends the first data to the first device based on a destination identifier of the first data and/or a terminal device identifier, where the destination identifier of the first data is used to indicate an identifier of a direct sending device for a terminal device receiving the first data, and the terminal device identifier is an identifier of the terminal device receiving the first data.

The terminal device identifier carried in the first data may be unique or may not be unique in a range connected to the fourth device. If the terminal device identifier is unique, the terminal device identifier carried in the first data before and after switching may not change. If the terminal device identifier is not unique, the terminal device identifier carried in the first data before and after switching also needs to be changed.

In a possible implementation, that the third device determines that received data is the first data includes the third device determines that data received from a forwarding channel is the first data.

In a possible implementation, when the third device determines that the received data is the first data, the received data includes at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of a child node of the third device sending the data, and a destination identifier carried in the received data is a destination identifier reachable based on a mapping relationship, and the received data is received from a first path, where the first path is not a path for receiving data of the first device by the third device.

In a possible implementation, a priority of sending the first data by the third device is higher than a priority of sending the second data by the third device, and the second data is the downlink data sent by the fourth device to the first device after switching.

In a possible implementation, when the second device is connected to the third device by at least one device, the at least one device is the fifth device, and the method further includes the fifth device receives data sent by a child node or a parent node of the fifth device, the fifth device determines that the received data is the first data, and the fifth device sends the first data to the third device, so that the third device sends the first data to the first device.

In a possible implementation, that the fifth device sends the first data to the third device includes the fifth device sends the first data to the third device based on a forwarding channel, where the forwarding channel is a channel from the second device to the third device through the fifth device, established by the fourth device by using signaling, and used to forward the first data.

In a possible implementation, that the fifth device determines that the received data is the first data includes the fifth device determines that data received from the forwarding channel is the first data.

In a possible implementation, that the fifth device sends the first data to the third device includes the fifth device sends the first data to the third device based on a mapping relationship, where the mapping relationship includes a destination identifier of a destination device that can be reached through the fifth device and an identifier of a next hop to the destination device.

In a possible implementation, the first data carries a destination identifier, and that the fifth device sends the first data to the third device based on a mapping relationship includes when an identifier of a next hop to the destination identifier exists in the mapping relationship of the fifth device, the fifth device sends the first data to a device identified by the next hop, so that the device identified by the next hop sends the first data to the third device, and/or when an identifier of a next hop to the destination identifier does not exist in the mapping relationship of the fifth device, the fifth device sends the first data to the parent node of the fifth device, so that a device identified by the next hop sends the first data to the third device, where the parent node of the fifth device is a device that is one-hop closer to the fourth device among devices that are directly connected to the fifth device.

In a possible implementation, that the fifth device determines that the received data is the first data includes when the fifth device is a device on a link between the second device and the fourth device, the fifth device determines the first data in data received from the child node of the fifth device, or when the fifth device is a device on a link between the third device and the fourth device, the fifth device determines the first data in data received from the parent node of the fifth device, where the child node of the fifth device is a device that is one-hop farther from the fourth device among the devices that are directly connected to the fifth device, and the parent node of the fifth device is a device that is one-hop closer to the fourth device among the devices that are directly connected to the fifth device.

In a possible implementation, when the fifth device determines that the received data is the first data, the received data includes at least one of the following items: the received data carries a forwarding identifier, the received data carries a plurality of destination identifiers, when data transmitted by the first device to the fourth device does not carry a destination identifier, the received data carries a destination identifier, according to the identifier of the next hop indicated by the mapping relationship, a destination identifier carried in the received data is not an identifier of the child node of the fifth device sending the data, and a destination identifier carried in the received data is a destination identifier reachable based on the mapping relationship, and the received data is received from a first path, where the first path is not a path for receiving data of the first device by the third device.

In a possible implementation, a priority of sending the first data by the fifth device is higher than a priority of sending the second data by the fifth device, and the second data is the downlink data sent by the fourth device to the first device after switching. For example, the fifth device preferentially transmits the first data, and the fifth device does not transmit the second data before completing transmission of the first data. Correspondingly, the second device preferentially transmits the first data, and the second device does not transmit the second data before completing transmission of the first data, and the third device preferentially transmits the first data, and the third device does not transmit the second data before completing transmission of the first data.

In a possible implementation, the first device switches, and the fourth device stops continuing to send a data packet to the second device, and sends an end data packet to the second device. Therefore, the second device can determine the first data, and forward the first data to the third device. The end data packet may be a data packet of a GPRS tunneling protocol layer, a PDCP layer, or an RLC layer, but is not limited to the foregoing data packet.

In a possible implementation, the first device switches, and the fourth device stops continuing to send a data packet to the second device, and sends an end data packet, instructing a device of the forwarding channel to release the forwarding channel and a non-common part of the downlink transmission channel.

In a possible implementation, data sent through the forwarding channel is preferentially transmitted before data transmission of the downlink transmission channel. For example, the fifth device transmits data of the downlink transmission channel after receiving the end packet.

According to a fourth aspect, this application further provides a data processing method, where the data processing method includes when a first device switches from a second device to a third device, determining, by the second device, data receiving status information of the first device, and reporting, by the second device, the data receiving status information of the first device, where the data receiving status information is used to instruct the fourth device to send data to the first device based on the data receiving status information.

In a possible implementation, the data receiving status information is used to indicate information about data that has been received by the second device but has not been acknowledged as received by the first device, in data sent by the fourth device to the first device through the second device.

In a possible implementation, the fourth device is connected to a core network device, and the second device and the third device are respectively connected to the core network device by the fourth device.

In a possible implementation, when at least one device exists on a link between the second device and the fourth device, the reporting, by the second device, the data receiving status information of the first device includes sending, by the second device, a first status message to a parent node of the second device, so that the parent node of the second device reports the data receiving status information of the first device to the fourth device based on the first status message, where the first status message carries the data receiving status information of the first device, and the parent node of the second device is a device that is one-hop closer to the fourth device among devices that are directly connected to the second device.

In a possible implementation, the sending, by the second device, a first status message to a parent node of the second device includes sending, by the second device, the first status message to the parent node of the second device based on a maintained mapping relationship, where the mapping relationship of the second device is a correspondence between a data packet number of data sent by the second device to the first device and a data packet number of data received from the parent node of the second device.

According to a fifth aspect, this application further provides a data processing method, where the data processing method includes receiving, by a fifth device, a first status message sent by a child node of the fifth device, where the first status message carries data receiving status information of a first device, and sending, by the fifth device, a second status message to a parent node of the fifth device based on the first status message, where the second status message carries the data receiving status information of the first device, where the parent node of the fifth device is a device that is one-hop closer to the fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending, by the fifth device, a second status message to a parent node of the fifth device based on the first status message includes sending, by the fifth device, the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to a sixth aspect, this application further provides a data processing apparatus, where the data processing apparatus may be disposed in a second device, and the data processing apparatus includes a determining module, configured to determine data receiving status information of a first device when the first device switches from the second device to a third device, and a reporting module, configured to report the data receiving status information of the first device, where the data receiving status information is used to instruct the fourth device to send data to the first device based on the data receiving status information.

In a possible implementation, the data receiving status information is used to indicate information about data that has been received by the second device but has not been acknowledged as received by the first device, in data sent by the fourth device to the first device through the second device.

In a possible implementation, the fourth device is connected to a core network device, and the second device and the third device are respectively connected to the core network device by the fourth device.

In a possible implementation, when at least one device exists on a link between the second device and the fourth device, the reporting the data receiving status information of the first device by the reporting module is specifically sending a first status message to a parent node of the second device, so that the parent node of the second device reports the data receiving status information of the first device to the fourth device based on the first status message, where the first status message carries the data receiving status information of the first device, and the parent node of the second device is a device that is one-hop closer to the fourth device among devices that are directly connected to the second device.

In a possible implementation, the sending a first status message to a parent node of the second device by the reporting module is specifically sending the first status message to the parent node of the second device based on a maintained mapping relationship, where the mapping relationship of the second device is a correspondence between a data packet number of data sent by the second device to the first device and a data packet number of data received from the parent node of the second device.

According to a seventh aspect, this application provides a data processing apparatus, where the data processing apparatus is disposed in a fifth device, and the data processing apparatus includes a receiving module, configured to receive a first status message sent by a child node of the fifth device, where the first status message carries data receiving status information of a first device, and a sending module, configured to send a second status message to a parent node of the fifth device based on the first status message, where the second status message carries the data receiving status information of the first device, where the parent node of the fifth device is a device that is one-hop closer to the fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending the second status message to a parent node of the fifth device based on the first status message by the sending module is specifically sending the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to an eighth aspect, this application further provides a device, including a processor and a communications interface, where the processor is configured to determine data receiving status information of a first device when the first device switches from the device to a third device, and the communications interface is configured to report the data receiving status information of the first device, where the data receiving status information is used to instruct the fourth device to send data to the first device based on the data receiving status information.

In a possible implementation, the data receiving status information is used to indicate information about data that has been received by the device but has not been acknowledged as received by the first device, in data sent by the fourth device to the first device through the device.

In a possible implementation, the fourth device is connected to a core network device, and the device and the third device are respectively connected to the core network device by the fourth device.

In a possible implementation, when at least one device exists on a link between the device and the fourth device, the reporting the data receiving status information of the first device by the communications interface is specifically sending a first status message to a parent node of the device, so that the parent node of the device reports the data receiving status information of the first device to the fourth device based on the first status message, where the first status message carries the data receiving status information of the first device, and the parent node of the device is a device that is one-hop closer to the fourth device among devices that are directly connected to the device.

In a possible implementation, the sending a first status message to a parent node of the device by the communications interface is specifically sending the first status message to the parent node of the device based on a maintained mapping relationship, where the mapping relationship of the device is a correspondence between a data packet number of data sent by the device to the first device and a data packet number of data received from the parent node of the device.

According to a ninth aspect, this application further provides a device, including a communications interface, where the communications interface is configured to receive a first status message sent by a child node of the device, where the first status message carries data receiving status information of a first device, and the communications interface is further configured to send a second status message to a parent node of the device based on the first status message, where the second status message carries the data receiving status information of the first device, where the parent node of the device is a device that is one-hop closer to the fourth device among devices that are directly connected to the device, the child node of the device is a device that is one-hop farther from the fourth device among the devices that are directly connected to the device, the fourth device is connected to a core network device, and the device is connected to the core network device by the fourth device.

In a possible implementation, the sending a second status message to a parent node of the device based on the first status message by the communications interface is specifically sending the second status message to the parent node of the device based on a maintained mapping relationship and the first status message, where the mapping relationship of the device is a correspondence between a data packet number of data sent by the parent node of the device to the device and a data packet number of the data sent by the device to the child node of the device.

In a possible implementation, the data status receiving information of the first device is used to instruct the fourth device to send data to the first device based on the status receiving information.

According to a tenth aspect, this application further provides a data processing method, where the data processing method includes after a first device switches from a second device to a third device, determining, by a sixth device, data receiving status information, and sending, by the sixth device, a status message to a fourth device through the first device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the method further includes receiving, by the sixth device, a first message, where the first message is used to instruct the sixth device to send the data receiving status information to the fourth device.

In a possible implementation, the first message is sent by the fourth device to the sixth device.

In a possible implementation, the first message is sent by the first device to the sixth device.

In a possible implementation, the first message is received in a form of a broadcast message.

According to an eleventh aspect, this application further provides a data processing method, where the data processing method includes when a first device switches from a second device to a third device, sending, by a fourth device, a first message to a sixth device, where the first message is used to instruct the sixth device to send data receiving status information to the fourth device, receiving, by the fourth device, a status message sent by the sixth device, where the status message carries the data receiving status information of the sixth device, and sending, by the fourth device, data to the sixth device based on the data receiving status information of the sixth device, where the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the first message is sent in broadcast mode.

According to a twelfth aspect, this application further provides a data processing method, where the data processing method includes when a first device switches from a second device to a third device, sending, by the first device, a first message to a sixth device, where the first message is used to instruct the sixth device to send data receiving status information to a fourth device, and receiving, by the first device, a status message sent by the sixth device, and sending the status message to the fourth device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the first message is sent in broadcast mode.

According to a thirteenth aspect, this application further provides a data processing apparatus, where the data processing apparatus is disposed in a sixth device, and the data processing apparatus includes a determining module, configured to determine data receiving status information after a first device switches from a second device to a third device, and a sending module, configured to send a status message to a fourth device through the first device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the apparatus further includes a receiving module, configured to receive a first message, where the first message is used to instruct the sixth device to send the data receiving status information to the fourth device.

In a possible implementation, the first message is sent by the fourth device to the sixth device.

In a possible implementation, the first message is sent by the first device to the sixth device.

In a possible implementation, the first message is received in a form of a broadcast message.

According to a fourteenth aspect, this application further provides a data processing apparatus, where the data processing apparatus is disposed in a fourth device, and the data processing apparatus includes a sending module, configured to send a first message to a sixth device when a first device switches from a second device to a third device, where the first message is used to instruct the sixth device to send data receiving status information to the fourth device, and a receiving module, configured to receive a status message sent by the sixth device, where the status message carries the data receiving status information of the sixth device, where the sending module is further configured to send data to the sixth device based on the data receiving status information of the sixth device, where the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the first message is sent in broadcast mode.

According to a fifteenth aspect, this application further provides a data processing apparatus, where the data processing apparatus is disposed in a first device, and the data processing apparatus includes a sending module, configured to send a first message to a sixth device when the first device switches from a second device to a third device, where the first message is used to instruct the sixth device to send data receiving status information to a fourth device, and a receiving module, configured to receive a status message sent by the sixth device, and send the status message to the fourth device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the first message is sent in broadcast mode.

According to a sixteenth aspect, this application further provides a device, where the device includes a processor and a communications interface, where the processor is configured to determine data receiving status information after a first device switches from a second device to a third device, and the communications interface is configured to send a status message to a fourth device through the first device, where the status message carries the data receiving status information of the device, where the status message is used to instruct the fourth device to send data to the device based on the data receiving status information of the device, the fourth device is connected to a core network device, the second device and the third device are respectively connected to the core network device by the fourth device, and the device is directly connected to the first device or connected to the first device by at least one device.

In a possible implementation, the data receiving status information is used to indicate data that has been acknowledged as received by the device, in data sent by the fourth device to the device, or used to indicate data that has not been received by the device, in data sent by the fourth device to the device.

In a possible implementation, the communications interface is further configured to receive a first message, where the first message is used to instruct the device to send the data receiving status information to the fourth device.

In a possible implementation, the first message is sent by the fourth device to the device.

In a possible implementation, the first message is sent by the first device to the device.

In a possible implementation, the first message is received in a form of a broadcast message.

According to a seventeenth aspect, this application further provides a device, where the device includes a communications interface, where the communications interface is configured to send a first message to a sixth device when a first device switches from a second device to a third device, where the first message is used to instruct the sixth device to send data receiving status information to the device, the communications interface is further configured to receive a status message sent by the sixth device, where the status message carries the data receiving status information of the sixth device, and the communications interface is further configured to send data to the sixth device based on the data receiving status information of the sixth device, where the device is connected to a core network device, the second device and the third device are respectively connected to the core network device by the device, and the sixth device is directly connected to the first device or connected to the first device by at least one device.

In a possible implementation, the data receiving status information is used to indicate data that has been acknowledged as received by the sixth device, in data sent by the device to the sixth device, or used to indicate data that has not been received by the sixth device, in data sent by the device to the sixth device.

In a possible implementation, the first message is sent in broadcast mode.

According to an eighteenth aspect, this application further provides a device, including a communications interface, where the communications interface is configured to send a first message to a sixth device when the device switches from a second device to a third device, where the first message is used to instruct the sixth device to send data receiving status information to a fourth device, and the communications interface is further configured to receive a status message sent by the sixth device, and send the status message to the fourth device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the device or connected to the device by at least one device.

In a possible implementation, the data receiving status information is used to indicate data that has been acknowledged as received by the sixth device, in data sent by the fourth device to the sixth device, or used to indicate data that has not been received by the sixth device, in data sent by the fourth device to the sixth device.

In a possible implementation, the first message is sent in broadcast mode.

According to a nineteenth aspect, this application further provides a data processing method, including after a first device switches from a second device to a third device, establishing, by a fourth device, a data transmission channel between the fourth device and the third device by using signaling, and establishing a data forwarding channel from the second device to the third device by using signaling, where the fourth device is connected to a core network device, and the second device and the third device are respectively connected to the core network device by the fourth device.

In a possible implementation, when both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device, and the parent node of the seventh device is a device that is one-hop closer to the fourth device among devices that are directly connected to the seventh device.

In a possible implementation, the parent node of the seventh device is a device that is passed through by both a link between the second device and the fourth device and a link between the third device and the fourth device.

According to a twentieth aspect, this application further provides a data processing method, including after a first device switches from a second device to a third device, determining, by the second device, first data, and sending, by the second device, the first data to the third device, so that the third device sends the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

In a possible implementation, the sending, by the second device, the first data to the third device includes sending, by the second device, the first data to the third device based on a forwarding channel, where the forwarding channel is a channel from the second device to the third device, established by the fourth device by using signaling, and used to forward the first data.

In a possible implementation, when the second device is connected to the third device by at least one device, the sending, by the second device, the first data to the third device based on a forwarding channel includes sending, by the second device, the first data to a parent node or a child node of the second device based on the forwarding channel, so that the parent node or the child node of the second device sends the first data to the third device, where the parent node of the second device is a device that is one-hop closer to the fourth device among devices that are directly connected to the second device, and the child node of the second device is a device that is one-hop farther from the fourth device among the devices that are directly connected to the second device.

In a possible implementation, the sending, by the second device, the first data to the third device includes sending, by the second device, the first data to the third device based on a mapping relationship, where the mapping relationship of the second device includes a destination identifier of a destination device that can be reached through the second device and an identifier of a next hop to the destination device.

In a possible implementation, the first data carries a first destination identifier, and the method further includes updating, by the second device, the first destination identifier to a second destination identifier, and the sending, by the second device, the first data to the third device based on a mapping relationship includes sending, by the second device, the first data to the third device based on the second destination identifier and the mapping relationship.

In a possible implementation, the sending, by the second device, the first data to the third device based on the second destination identifier and the mapping relationship includes when an identifier of a next hop to the second destination identifier exists in the mapping relationship of the second device, sending, by the second device, the first data to a device identified by the next hop, so that the device identified by the next hop sends the first data to the third device, and/or when an identifier of a next hop to the second destination identifier does not exist in the mapping relationship of the second device, sending, by the second device, the first data to a parent node of the second device, so that the parent node of the second device sends the first data to the third device, where the parent node of the second device is a device that is one-hop closer to the fourth device among devices that are directly connected to the second device.

In a possible implementation, the updating, by the second device, the first destination identifier to a second destination identifier includes adding, by the second device, an identifier of the third device to the first destination identifier to obtain the second destination identifier, or changing, by the second device, the first destination identifier to an identifier of the third device to obtain the second destination identifier, or adding, by the second device, a forwarding identifier to the first destination identifier to obtain the second destination identifier, where the forwarding identifier is used to indicate data forwarding.

In a possible implementation, the first data carries a first destination identifier, and the sending, by the second device, the first data to the third device based on a mapping relationship includes sending, by the second device, the first data to the third device based on the first destination identifier and the mapping relationship.

In a possible implementation, the sending, by the second device, the first data to the third device based on the first destination identifier and the mapping relationship includes when an identifier of a next hop to the first destination identifier exists in the mapping relationship of the second device, sending, by the second device, the first data to a device identified by the next hop, so that the device identified by the next hop sends the first data to the third device, and/or when an identifier of a next hop to the first destination identifier does not exist in the mapping relationship of the second device, sending, by the second device, the first data to a parent node of the second device, so that the parent node of the second device sends the first data to the third device, where the parent node of the second device is a device that is one-hop closer to the fourth device among devices that are directly connected to the second device.

In a possible implementation, a priority of sending the first data by the second device is higher than a priority of sending second data by the second device, and the second data is downlink data sent by the fourth device to the first device after switching.

According to a twenty-first aspect, this application further provides a data processing method, including when a first device switches from a second device to a third device, determining, by the third device, that received data is first data, and sending, by the third device, the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

In a possible implementation, the determining, by the third device, that received data is first data includes determining, by the third device, that data received from a forwarding channel is the first data.

In a possible implementation, the sending, by the third device, the first data to the first device includes sending, by the third device, the first data to the first device based on a destination identifier of the first data and/or a terminal device identifier, where the destination identifier of the first data is used to indicate an identifier of a direct sending device for a terminal device receiving the first data, and the terminal device identifier is an identifier of the terminal device receiving the first data.

In a possible implementation, the determining, by the third device, that received data is first data includes determining, by the third device, the first data in data received from a child node of the third device, where the child node of the third device is a device that is one-hop farther from the fourth device among devices that are directly connected to the third device.

In a possible implementation, when the third device determines that the received data is the first data, the received data includes at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of the child node of the third device sending the data, and a destination identifier carried in the received data is a destination identifier of the third device reachable based on a mapping relationship, and the received data is received from a first path, where the first path is not a path for receiving data of the first device by the third device.

In a possible implementation, a priority of sending the first data by the third device is higher than a priority of sending second data by the third device, and the second data is downlink data sent by the fourth device to the first device after switching.

According to a twenty-second aspect, this application further provides a data processing method, including receiving, by a fifth device, data sent by a child node or a parent node of the fifth device, determining, by the fifth device, that the received data is first data, and sending, by the fifth device, the first data to the third device, so that the third device sends the first data to the first device.

In a possible implementation, the first data is data that has been received by the second device but has not been acknowledged as received by the first device, in data sent by the fourth device to the first device through the second device, and the fourth device is connected to a core network device, the second device and the third device are respectively connected to the core network device by the fourth device, and the second device is connected to the third device by at least the fifth device.

In a possible implementation, the sending, by the fifth device, the first data to the third device includes sending, by the fifth device, the first data to the third device based on a forwarding channel, where the forwarding channel is a channel from the second device to the third device through the fifth device, established by the fourth device by using signaling, and used to forward the first data.

In a possible implementation, the determining, by the fifth device, that the received data is first data includes determining, by the fifth device, that data received from the forwarding channel is the first data.

In a possible implementation, the sending, by the fifth device, the first data to the third device includes sending, by the fifth device, the first data to the third device based on a mapping relationship, where the mapping relationship includes a destination identifier of a destination device that can be reached through the fifth device and an identifier of a next hop to the destination device.

In a possible implementation, the first data carries a destination identifier, and the sending, by the fifth device, the first data to the third device based on a mapping relationship includes when an identifier of a next hop to the destination identifier exists in the mapping relationship of the fifth device, sending, by the fifth device, the first data to a device identified by the next hop, so that the device identified by the next hop sends the first data to the third device, and/or when an identifier of a next hop to the destination identifier does not exist in the mapping relationship of the fifth device, sending, by the fifth device, the first data to the parent node of the fifth device, so that a device identified by the next hop sends the first data to the third device, where the parent node of the fifth device is a device that is one-hop closer to the fourth device among devices that are directly connected to the fifth device.

In a possible implementation, the determining, by the fifth device, that the received data is first data includes when the fifth device is a device on a link between the second device and the fourth device, determining, by the fifth device, the first data in data received from the child node of the fifth device, or when the fifth device is a device on a link between the third device and the fourth device, determining, by the fifth device, the first data in data received from the parent node of the fifth device, where the child node of the fifth device is a device that is one-hop farther from the fourth device among the devices that are directly connected to the fifth device, and the parent node of the fifth device is a device that is one-hop closer to the fourth device among the devices that are directly connected to the fifth device.

In a possible implementation, when the fifth device determines that the received data is the first data, the received data includes at least one of the following items: the received data carries a forwarding identifier, the received data carries a plurality of destination identifiers, when data transmitted by the first device to the fourth device does not carry a destination identifier, the received data carries a destination identifier, according to the identifier of the next hop indicated by the mapping relationship, a destination identifier carried in the received data is not an identifier of the child node of the fifth device sending the data, and a destination identifier carried in the received data is a destination identifier reachable based on the mapping relationship, and the received data is received from a first path, where the first path is not a path for receiving data of the first device by the third device.

In a possible implementation, a priority of sending the first data by the fifth device is higher than a priority of sending second data by the fifth device, and the second data is downlink data sent by the fourth device to the first device after switching.

According to a twenty-third aspect, this application further provides a data processing apparatus, where the data processing apparatus may be disposed in a fourth device, and the data processing apparatus includes a channel establishing module, configured to after a first device switches from a second device to a third device, establish a data transmission channel between the fourth device and the third device by using signaling, and establish a data forwarding channel from the second device to the third device by using signaling, where the fourth device is connected to a core network device, and the second device and the third device are respectively connected to the core network device by the fourth device.

In a possible implementation, when both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device, and the parent node of the seventh device is a device that is one-hop closer to the fourth device among devices that are directly connected to the seventh device.

In a possible implementation, the parent node of the seventh device is a device that is passed through by both a link between the second device and the fourth device and a link between the third device and the fourth device.

According to a twenty-fourth aspect, this application further provides a data processing apparatus, where the data processing apparatus may be disposed in a second device, and the data processing apparatus includes a determining module, configured to determine first data after a first device switches from the second device to a third device, and a sending module, configured to send the first data to the third device, so that the third device sends the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

In a possible implementation, the sending the first data to the third device by the sending module is specifically sending the first data to the third device based on a forwarding channel, where the forwarding channel is a channel from the second device to the third device, established by the fourth device by using signaling, and used to forward the first data.

In a possible implementation, when the second device is connected to the third device by at least one device, the sending the first data to the third device based on a forwarding channel by the sending module is specifically sending the first data to a parent node or a child node of the second device based on the forwarding channel, so that the parent node or the child node of the second device sends the first data to the third device, where the parent node of the second device is a device that is one-hop closer to the fourth device among devices that are directly connected to the second device, and the child node of the second device is a device that is one-hop farther from the fourth device among the devices that are directly connected to the second device.

In a possible implementation, the sending the first data to the third device by the sending module is specifically sending the first data to the third device based on a mapping relationship, where the mapping relationship of the second device includes a destination identifier of a destination device that can be reached through the second device and an identifier of a next hop to the destination device.

In a possible implementation, the first data carries a first destination identifier, and the apparatus further includes an updating module, configured to update the first destination identifier to a second destination identifier, and the sending the first data to the third device based on a mapping relationship by the sending module is specifically sending the first data to the third device based on the second destination identifier and the mapping relationship.

In a possible implementation, the sending the first data to the third device based on the second destination identifier and the mapping relationship by the sending module is specifically when an identifier of a next hop to the second destination identifier exists in the mapping relationship of the second device, sending the first data to a device identified by the next hop, so that the device identified by the next hop sends the first data to the third device, and/or when an identifier of a next hop to the second destination identifier does not exist in the mapping relationship of the second device, sending the first data to a parent node of the second device, so that the parent node of the second device sends the first data to the third device, where the parent node of the second device is a device that is one-hop closer to the fourth device among devices that are directly connected to the second device.

In a possible implementation, the updating the first destination identifier to a second destination identifier by the updating module is specifically adding an identifier of the third device to the first destination identifier to obtain the second destination identifier, or changing the first destination identifier to an identifier of the third device to obtain the second destination identifier, or adding a forwarding identifier to the first destination identifier to obtain the second destination identifier, where the forwarding identifier is used to indicate data forwarding.

In a possible implementation, the first data carries a first destination identifier, and the sending the first data to the third device based on a mapping relationship by the sending module is specifically sending the first data to the third device based on the first destination identifier and the mapping relationship.

In a possible implementation, the sending the first data to the third device based on the first destination identifier and the mapping relationship by the sending module is specifically when an identifier of a next hop to the first destination identifier exists in the mapping relationship of the second device, sending the first data to a device identified by the next hop, so that the device identified by the next hop sends the first data to the third device, and/or when an identifier of a next hop to the first destination identifier does not exist in the mapping relationship of the second device, sending, by the second device, the first data to a parent node of the second device, so that the parent node of the second device sends the first data to the third device, where the parent node of the second device is a device that is one-hop closer to the fourth device among devices that are directly connected to the second device.

In a possible implementation, a priority of sending the first data by the sending module is higher than a priority of sending second data by the sending module, and the second data is downlink data sent by the fourth device to the first device after switching.

According to a twenty-fifth aspect, this application further provides a data processing apparatus, where the data processing apparatus may be disposed in a third device, and the data processing apparatus includes a determining module, configured to determine that received data is first data when a first device switches from a second device to the third device, and a sending module, configured to send the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

In a possible implementation, the determining, by the third device, that received data is first data includes determining, by the third device, that data received from a forwarding channel is the first data.

In a possible implementation, the sending, by the third device, the first data to the first device includes sending, by the third device, the first data to the first device based on a destination identifier of the first data and/or a terminal device identifier, where the destination identifier of the first data is used to indicate an identifier of a direct sending device for a terminal device receiving the first data, and the terminal device identifier is an identifier of the terminal device receiving the first data.

In a possible implementation, the determining, by the third device, that received data is first data includes determining, by the third device, the first data in data received from a parent node of the third device, where the parent node of the third device is a device that is one-hop farther from the fourth device among devices that are directly connected to the third device.

In a possible implementation, when the third device determines that the received data is the first data, the received data includes at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of the child node of the third device sending the data, and a destination identifier carried in the received data is a destination identifier of the third device reachable based on a mapping relationship, and the received data is received from a first path, where the first path is not a path for receiving data of the first device by the third device.

In a possible implementation, a priority of sending the first data by the sending module is higher than a priority of sending second data by the sending module, and the second data is downlink data sent by the fourth device to the first device after switching.

According to a twenty-sixth aspect, this application further provides a data processing apparatus, where the data processing apparatus may be disposed in a fifth device, and the data processing apparatus includes a receiving module, configured to receive data sent by a child node or a parent node of the fifth device, a determining module, configured to determine that the received data is first data, and a sending module, configured to send the first data to the third device, so that the third device sends the first data to the first device.

In a possible implementation, the first data is data that has been received by the second device but has not been acknowledged as received by the first device, in data sent by the fourth device to the first device through the second device, and the fourth device is connected to a core network device, the second device and the third device are respectively connected to the core network device by the fourth device, and the second device is connected to the third device by at least the fifth device.

In a possible implementation, the sending the first data to the third device by the sending module is specifically sending the first data to the third device based on a forwarding channel, where the forwarding channel is a channel from the second device to the third device through the fifth device, established by the fourth device by using signaling, and used to forward the first data.

In a possible implementation, the determining that the received data is first data by the determining module is specifically determining that data received from the forwarding channel is the first data.

In a possible implementation, the sending the first data to the third device by the sending module is specifically sending the first data to the third device based on a mapping relationship, where the mapping relationship includes a destination identifier of a destination device that can be reached through the fifth device and an identifier of a next hop to the destination device.

In a possible implementation, the first data carries a destination identifier, and the sending the first data to the third device based on a mapping relationship by the sending module is specifically when an identifier of a next hop to the destination identifier exists in the mapping relationship of the fifth device, sending the first data to a device identified by the next hop, so that the device identified by the next hop sends the first data to the third device, and/or when an identifier of a next hop to the destination identifier does not exist in the mapping relationship of the fifth device, sending the first data to the parent node of the fifth device, so that a device identified by the next hop sends the first data to the third device, where the parent node of the fifth device is a device that is one-hop closer to the fourth device among devices that are directly connected to the fifth device.

In a possible implementation, the determining that the received data is first data by the determining module includes when the fifth device is a device on a link between the second device and the fourth device, determining the first data in data received from the child node of the fifth device, or when the fifth device is a device on a link between the third device and the fourth device, determining the first data in data received from the parent node of the fifth device, where the child node of the fifth device is a device that is one-hop farther from the fourth device among the devices that are directly connected to the fifth device, and the parent node of the fifth device is a device that is one-hop closer to the fourth device among the devices that are directly connected to the fifth device.

In a possible implementation, when the determining module determines that the received data is the first data, the received data includes at least one of the following items: the received data carries a forwarding identifier, the received data carries a plurality of destination identifiers, when data transmitted by the first device to the fourth device does not carry a destination identifier, the received data carries a destination identifier, according to the identifier of the next hop indicated by the mapping relationship, a destination identifier carried in the received data is not an identifier of the child node of the fifth device sending the data, and a destination identifier carried in the received data is a destination identifier reachable based on the mapping relationship, and the received data is received from a first path, where the first path is not a path for receiving data of the first device by the third device.

In a possible implementation, a priority of sending the first data by the sending module is higher than a priority of sending second data by the sending module, and the second data is downlink data sent by the fourth device to the first device after switching.

According to a twenty-seventh aspect, this application further provides a device, where the device includes after a first device switches from a second device to a third device, establishing a data transmission channel between the device and the third device by using signaling, and establishing a data forwarding channel from the second device to the third device by using signaling, where the device is connected to a core network device, and the second device and the third device are respectively connected to the core network device by the device.

In a possible implementation, when both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device, and the parent node of the seventh device is a device that is one-hop closer to the device among devices that are directly connected to the seventh device.

In a possible implementation, the parent node of the seventh device is a device that is passed through by both a link between the second device and the device and a link between the third device and the device.

According to a twenty-eighth aspect, this application further provides a device, where the device includes a processor and a communications interface, where the processor is configured to determine first data after a first device switches from the device to a third device, and the communications interface is configured to send the first data to the third device, so that the third device sends the first data to the first device, where the first data is data that has been received by the device but has not been acknowledged as received by the first device, in data sent by the fourth device to the first device through the device, and the fourth device is connected to a core network device, and the device and the third device are respectively connected to the core network device by the fourth device.

In a possible implementation, the sending the first data to the third device by the communications interface is specifically sending the first data to the third device based on a forwarding channel, where the forwarding channel is a channel from the device to the third device, established by the fourth device by using signaling, and used to forward the first data.

In a possible implementation, when the device is connected to the third device by at least one device, the sending the first data to the third device based on a forwarding channel by the communications interface is specifically sending the first data to a parent node or a child node of the device based on the forwarding channel, so that the parent node or the child node of the device sends the first data to the third device, where the parent node of the device is a device that is one-hop closer to the fourth device among devices that are directly connected to the device, and the child node of the device is a device that is one-hop farther from the fourth device among the devices that are directly connected to the device.

In a possible implementation, the sending the first data to the third device by the communications interface is specifically sending the first data to the third device based on a mapping relationship, where the mapping relationship of the device includes a destination identifier of a destination device that can be reached through the device and an identifier of a next hop to the destination device.

In a possible implementation, the first data carries a first destination identifier, and the processor is further configured to update the first destination identifier to a second destination identifier, and the sending the first data to the third device based on a mapping relationship by the communications interface is specifically sending the first data to the third device based on the second destination identifier and the mapping relationship.

In a possible implementation, the sending the first data to the third device based on the second destination identifier and the mapping relationship by the communications interface is specifically when an identifier of a next hop to the second destination identifier exists in the mapping relationship of the device, sending the first data to a device identified by the next hop, so that the device identified by the next hop sends the first data to the third device, and/or when an identifier of a next hop to the second destination identifier does not exist in the mapping relationship of the device, sending the first data to a parent node of the device, so that the parent node of the device sends the first data to the third device, where the parent node of the device is a device that is one-hop closer to the fourth device among devices that are directly connected to the device.

In a possible implementation, the updating the first destination identifier to a second destination identifier by the processor is specifically adding an identifier of the third device to the first destination identifier to obtain the second destination identifier, or changing the first destination identifier to an identifier of the third device to obtain the second destination identifier, or adding a forwarding identifier to the first destination identifier to obtain the second destination identifier, where the forwarding identifier is used to indicate data forwarding.

In a possible implementation, the first data carries a first destination identifier, and the sending the first data to the third device based on a mapping relationship by the device is specifically sending the first data to the third device based on the first destination identifier and the mapping relationship.

In a possible implementation, the sending the first data to the third device based on the first destination identifier and the mapping relationship by the communications interface is specifically when an identifier of a next hop to the first destination identifier exists in the mapping relationship of the device, sending the first data to a device identified by the next hop, so that the device identified by the next hop sends the first data to the third device, and/or when an identifier of a next hop to the first destination identifier does not exist in the mapping relationship of the device, sending the first data to a parent node of the device, so that the parent node of the device sends the first data to the third device, where the parent node of the device is a device that is one-hop closer to the fourth device among devices that are directly connected to the device.

In a possible implementation, a priority of sending the first data by the communications interface is higher than a priority of sending second data by the communications interface, and the second data is downlink data sent by the fourth device to the first device after switching.

According to a twenty-ninth aspect, this application further provides a device, where the device includes a processor and a communications interface, where the processor is configured to determine that received data is first data when a first device switches from a second device to the device, and the communications interface is configured to send the first data to the first device, where the first data is data that has been received by the second device but has not been acknowledged as received by the first device, in data sent by the fourth device to the first device through the second device, and the fourth device is connected to a core network device, and the second device and the device are respectively connected to the core network device by the fourth device.

In a possible implementation, the determining that received data is first data by the processor is specifically determining that data received from a forwarding channel is the first data.

In a possible implementation, the sending the first data to the first device by the communications interface is specifically sending the first data to the first device based on a destination identifier of the first data and/or a terminal device identifier, where the destination identifier of the first data is used to indicate an identifier of a direct sending device for a terminal device receiving the first data, and the terminal device identifier is an identifier of the terminal device receiving the first data.

In a possible implementation, the determining that received data is first data by the processor is specifically determining the first data in data received from a parent node of the device, where the parent node of the device is a device that is one-hop farther from the fourth device among devices that are directly connected to the device.

In a possible implementation, when the processor determines that the received data is the first data, the received data includes at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of the child node of the device sending the data, and a destination identifier carried in the received data is a destination identifier of the device reachable based on a mapping relationship, and the received data is received from a first path, where the first path is not a path for receiving data of the first device by the device.

In a possible implementation, a priority of sending the first data by the communications interface is higher than a priority of sending second data by the communications interface, and the second data is downlink data sent by the fourth device to the first device after switching.

According to a thirtieth aspect, this application further provides a device, where the device includes a processor and a communications interface, where the communications interface is configured to receive data sent by a child node or a parent node of the device, the processor is configured to determine that the received data is first data, and the communications interface is configured to send the first data to the third device, so that the third device sends the first data to the first device.

In a possible implementation, the first data is data that has been received by the second device but has not been acknowledged as received by the first device, in data sent by the fourth device to the first device through the second device, and the fourth device is connected to a core network device, the second device and the third device are respectively connected to the core network device by the fourth device, and the second device is connected to the third device by at least the device.

In a possible implementation, the sending the first data to the third device by the communications interface is specifically sending the first data to the third device based on a forwarding channel, where the forwarding channel is a channel from the second device to the third device through the device, established by the fourth device by using signaling, and used to forward the first data.

In a possible implementation, the determining that the received data is first data by the processor is specifically determining that data received from the forwarding channel is the first data.

In a possible implementation, the sending the first data to the third device by the communications interface is specifically sending the first data to the third device based on a mapping relationship, where the mapping relationship includes a destination identifier of a destination device that can be reached through the device and an identifier of a next hop to the destination device.

In a possible implementation, the first data carries a destination identifier, and the sending the first data to the third device based on a mapping relationship by the communications interface is specifically when an identifier of a next hop to the destination identifier exists in the mapping relationship of the device, sending the first data to a device identified by the next hop, so that the device identified by the next hop sends the first data to the third device, and/or when an identifier of a next hop to the destination identifier does not exist in the mapping relationship of the device, sending the first data to the parent node of the device, so that a device identified by the next hop sends the first data to the third device, where the parent node of the device is a device that is one-hop closer to the fourth device among devices that are directly connected to the device.

In a possible implementation, the determining that the received data is first data by the processor is specifically when the device is a device on a link between the second device and the fourth device, determining the first data in data received from the child node of the device, and/or when the device is a device on a link between the third device and the fourth device, determining the first data in data received from the parent node of the device, where the child node of the device is a device that is one-hop farther from the fourth device among the devices that are directly connected to the device, and the parent node of the device is a device that is one-hop closer to the fourth device among the devices that are directly connected to the device.

In a possible implementation, when the processor determines that the received data is the first data, the received data includes at least one of the following items: the received data carries a forwarding identifier, the received data carries a plurality of destination identifiers, when data transmitted by the first device to the fourth device does not carry a destination identifier, the received data carries a destination identifier, according to the identifier of the next hop indicated by the mapping relationship, a destination identifier carried in the received data is not an identifier of the child node of the device sending the data, and a destination identifier carried in the received data is a destination identifier reachable based on the mapping relationship, and the received data is received from a first path, where the first path is not a path for receiving data of the first device by the third device.

In a possible implementation, a priority of sending the first data by the communications interface is higher than a priority of sending second data by the communications interface, and the second data is downlink data sent by the fourth device to the first device after switching.

According to a thirty-first aspect, this application provides a data processing method, where the method includes first, when a first device switches from a second device or switches from a second device to a third device, determining, by the second device, data receiving status information of the first device, and then, sending, by the second device, a first message to a parent node of the second device based on the data receiving status information of the first device, where the first message includes or indicates the data receiving status information of the first device.

In a possible implementation, the parent node of the second device is a device that is one-hop closer to a fourth device among devices that are directly connected to a fifth device, the fourth device is connected to a core network device, and a fifth device is connected to the core network device by the fourth device.

In a possible implementation, the first message is used to include or indicate information about data that has been received by the second device but has not been acknowledged as received by the first device, in data sent by the parent node of the second device to the first device through the second device, or used to include or indicate information about data that has not been acknowledged as received by the first device, in data sent by the parent node of the second device to the first device through the second device, or used to include or indicate information about data that has been received by the second device and has been acknowledged as received by the first device, in data sent by the parent node of the second device to the first device through the second device, or used to include or indicate information about data that has been acknowledged as received by the first device, in data sent by the parent node of the second device to the first device through the second device.

In a possible implementation, the sending, by the second device, a first message to a parent node of the second device includes sending, by the second device, the first message to the parent node of the second device based on a maintained mapping relationship, where the mapping relationship of the second device is a correspondence between a data packet number of data sent by the second device to the first device and a data packet number of data received from the parent node of the second device.

In a possible implementation, the data status receiving information of the first device is used to instruct the fourth device to send data to the first device based on the status receiving information.

According to a thirty-second aspect, this application provides a data processing method, where the method includes first, receiving, by a fifth device, a first message sent by a child node of the fifth device, where the first message includes or indicates data receiving status information of a first device, and then, sending, by the fifth device, the second message to a parent node of the fifth device based on the first message, where the second message includes or indicates the data receiving status information of the first device, where the parent node of the fifth device is a device that is one-hop closer to a fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending, by the fifth device, the second message to a parent node of the fifth device based on the first message includes sending, by the fifth device, the second message to the parent node of the fifth device based on a maintained mapping relationship and the first message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to a thirty-third aspect, this application further provides a data processing apparatus, where the data processing apparatus may be disposed in a second device, and the data processing apparatus includes a determining module, configured to determine data receiving status information of a first device when the first device switches from the second device or switches from the second device to a third device, and a sending module, configured to send a first message to a parent node of the second device based on the data receiving status information of the first device, where the first message includes or indicates the data receiving status information of the first device.

In a possible implementation, the parent node of the second device is a device that is one-hop closer to a fourth device among devices that are directly connected to a fifth device, the fourth device is connected to a core network device, and a fifth device is connected to the core network device by the fourth device.

In a possible implementation, the first message is used to include or indicate information about data that has been received by the second device but has not been acknowledged as received by the first device, in data sent by the parent node of the second device to the first device through the second device, or used to include or indicate information about data that has not been acknowledged as received by the first device, in data sent by the parent node of the second device to the first device through the second device, or used to include or indicate information about data that has been received by the second device and has been acknowledged as received by the first device, in data sent by the parent node of the second device to the first device through the second device, or used to include or indicate information about data that has been acknowledged as received by the first device, in data sent by the parent node of the second device to the first device through the second device.

In a possible implementation, the sending, by the sending module, a first message to a parent node of the second device includes sending, by the sending module, the first message to the parent node of the second device based on a maintained mapping relationship, where the mapping relationship of the second device is a correspondence between a data packet number of data sent by the second device to the first device and a data packet number of data received from the parent node of the second device.

In a possible implementation, the data status receiving information of the first device is used to instruct the fourth device to send data to the first device based on the status receiving information.

According to a thirty-fourth aspect, this application further provides a data processing apparatus, where the data processing apparatus may be disposed in a fifth device, and the data processing apparatus includes a receiving module, configured to receive a first message sent by a child node of the fifth device, where the first message includes or indicates data receiving status information of a first device, and a sending module, configured to send the second message to a parent node of the fifth device based on the first message, where the second message includes or indicates the data receiving status information of the first device, where the parent node of the fifth device is a device that is one-hop closer to a fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending, by the sending module, the second message to a parent node of the fifth device based on the first message specifically includes sending, by the sending module, the second message to the parent node of the fifth device based on a maintained mapping relationship and the first message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to a thirty-fifth aspect, this application further provides a device, where the device includes a processor and a communications interface, where the processor is configured to determine data receiving status information of a first device when the first device switches from the device or switches from the device to a third device, and then send a first message to a parent node of the device through the communications interface based on the data receiving status information of the first device, where the first message includes or indicates the data receiving status information of the first device.

In a possible implementation, the parent node of the device is a device that is one-hop closer to a fourth device among devices that are directly connected to a fifth device, the fourth device is connected to a core network device, and a fifth device is connected to the core network device by the fourth device.

In a possible implementation, the first message is used to include or indicate information about data that has been received by the device but has not been acknowledged as received by the first device, in data sent by the parent node of the device to the first device through the device, or used to include or indicate information about data that has not been acknowledged as received by the first device, in data sent by the parent node of the device to the first device through the device, or used to include or indicate information about data that has been received by the device and has been acknowledged as received by the first device, in data sent by the parent node of the device to the first device through the device, or used to include or indicate information about data that has been acknowledged as received by the first device, in data sent by the parent node of the device to the first device through the device.

In a possible implementation, the sending, by the processor, a first message to a parent node of the device through the communications interface specifically includes sending, by the processor, the first message to the parent node of the device through the communications interface based on a maintained mapping relationship, where the mapping relationship of the device is a correspondence between a data packet number of data sent by the device to the first device and a data packet number of data received from the parent node of the device.

In a possible implementation, the data status receiving information of the first device is used to instruct the fourth device to send data to the first device based on the status receiving information.

According to a thirty-sixth aspect, this application further provides a device, where the device includes a processor and a communications interface, where the processor is configured to receive, through the communications interface, a first message sent by a child node of the device, where the first message includes or indicates data receiving status information of a first device, and then the processor sends the second message to a parent node of the device through the communications interface based on the first message, where the second message includes or indicates the data receiving status information of the first device, where the parent node of the device is a device that is one-hop closer to a fourth device among devices that are directly connected to the device, the child node of the device is a device that is one-hop farther from the fourth device among the devices that are directly connected to the device, the fourth device is connected to a core network device, and the device is connected to the core network device by the fourth device.

In a possible implementation, the sending, by the device, the second message to a parent node of the device based on the first message includes sending, by the device, the second message to the parent node of the device based on a maintained mapping relationship and the first message, where the mapping relationship of the device is a correspondence between a data packet number of data sent by the parent node of the device to the device and a data packet number of the data sent by the device to the child node of the device.

In a possible implementation, the data status receiving information of the first device is used to instruct the fourth device to send data to the first device based on the status receiving information.

According to a thirty-seventh aspect, this application provides a data processing method, including when a first device switches from a second device or switches from a second device to a third device, determining, by the second device, data receiving status information of the first device, and then, reporting, by the second device, the data receiving status information of the first device.

In a possible implementation, the data receiving status information is used to include or indicate information about data that has been received by the second device but has not been acknowledged as received by the first device, in data sent by a fourth device to the first device through the second device, or used to include or indicate information about data that has not been acknowledged as received by the first device, in data sent by the fourth device to the first device through the second device, or used to include or indicate information about data that has been received by the second device and has been acknowledged as received by the first device, in data sent by the fourth device to the first device through the second device, or used to include or indicate information about data that has been acknowledged as received by the first device, in data sent by the fourth device to the first device through the second device.

In a possible implementation, the fourth device is connected to a core network device, and the second device and the third device are respectively connected to the core network device by the fourth device.

In a possible implementation, when at least one device exists on a link between the second device and the fourth device, the reporting, by the second device, the data receiving status information of the first device includes sending, by the second device, a first status message to a parent node of the second device, where the first status message is used by the parent node of the second device to report the data receiving status information of the first device, the first status message includes or indicates the data receiving status information of the first device, and the parent node of the second device is a device that is one-hop closer to the fourth device among devices that are directly connected to the second device.

In a possible implementation, the sending, by the second device, a first status message to a parent node of the second device includes sending, by the second device, the first status message to the parent node of the second device based on a maintained mapping relationship, where the mapping relationship of the second device is a correspondence between a data packet number of data sent by the second device to the first device and a data packet number of data received from the parent node of the second device.

In a possible implementation, the data receiving status information is used to instruct the fourth device to send data to the first device based on the data receiving status information.

According to a thirty-eighth aspect, this application provides a data processing method, including first, receiving, by a fifth device, a first status message sent by a child node of the fifth device, where the first status message includes or indicates data receiving status information of a first device, and then, sending, by the fifth device, a second status message to a parent node of the fifth device based on the first status message, where the second status message includes or indicates the data receiving status information of the first device, where the parent node of the fifth device is a device that is one-hop closer to the fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending, by the fifth device, a second status message to a parent node of the fifth device based on the first status message includes sending, by the fifth device, the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to a thirty-ninth aspect, this application further provides a data processing apparatus, where the data processing apparatus may be disposed in a second device, and the data processing apparatus includes a determining module, configured to determine data receiving status information of a first device when the first device switches from the second device or switches from the second device to a third device, and a reporting module, configured to report the data receiving status information of the first device.

In a possible implementation, the data receiving status information is used to include or indicate information about data that has been received by the second device but has not been acknowledged as received by the first device, in data sent by a fourth device to the first device through the second device, or used to include or indicate information about data that has not been acknowledged as received by the first device, in data sent by the fourth device to the first device through the second device, or used to include or indicate information about data that has been received by the second device and has been acknowledged as received by the first device, in data sent by the fourth device to the first device through the second device, or used to include or indicate information about data that has been acknowledged as received by the first device, in data sent by the fourth device to the first device through the second device.

In a possible implementation, the fourth device is connected to a core network device, and the second device and the third device are respectively connected to the core network device by the fourth device.

In a possible implementation, when at least one device exists on a link between the second device and the fourth device, the reporting, by the reporting module, the data receiving status information of the first device specifically includes a sending unit, configured to send a first status message to a parent node of the second device, where the first status message is used by the parent node of the second device to report the data receiving status information of the first device, the first status message includes or indicates the data receiving status information of the first device, and the parent node of the second device is a device that is one-hop closer to the fourth device among devices that are directly connected to the second device.

In a possible implementation, the sending, by the second device, a first status message to a parent node of the second device includes sending, by the second device, the first status message to the parent node of the second device based on a maintained mapping relationship, where the mapping relationship of the second device is a correspondence between a data packet number of data sent by the second device to the first device and a data packet number of data received from the parent node of the second device.

In a possible implementation, the data receiving status information is used to instruct the fourth device to send data to the first device based on the data receiving status information.

According to a fortieth aspect, this application further provides a data processing apparatus, where the data processing apparatus may be disposed in a fifth device, and the data processing apparatus includes a sending apparatus, configured to receive a first status message sent by a child node of the fifth device, where the first status message includes or indicates data receiving status information of a first device, and the sending apparatus sends a second status message to a parent node of the fifth device based on the first status message, where the second status message includes or indicates the data receiving status information of the first device, where the parent node of the fifth device is a device that is one-hop closer to the fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

In a possible implementation, the sending, by the sending apparatus, the second status message to a parent node of the fifth device based on the first status message specifically includes sending, by the sending apparatus, the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

In a possible implementation, the data status receiving information of the first device is used to instruct the fourth device to send data to the first device based on the status receiving information.

According to a forty-first aspect, this application further provides a device, including a processor and a communications interface, where the processor is configured to first determine data receiving status information of a first device when the first device switches from the device or switches from the device to a third device, and then report the data receiving status information of the first device through the communications interface.

In a possible implementation, the data receiving status information is used to include or indicate information about data that has been received by the device but has not been acknowledged as received by the first device, in data sent by a fourth device to the first device through the device, or used to include or indicate information about data that has not been acknowledged as received by the first device, in data sent by the fourth device to the first device through the device, or used to include or indicate information about data that has been received by the device and has been acknowledged as received by the first device, in data sent by the fourth device to the first device through the device, or used to include or indicate information about data that has been acknowledged as received by the first device, in data sent by the fourth device to the first device through the device.

In a possible implementation, the fourth device is connected to a core network device, and the device and the third device are respectively connected to the core network device by the fourth device.

In a possible implementation, when at least one device exists on a link between the device and the fourth device, the reporting, by the device, the data receiving status information of the first device includes sending, by the device, a first status message to a parent node of the device, where the first status message is used by the parent node of the device to report the data receiving status information of the first device, the first status message includes or indicates the data receiving status information of the first device, and the parent node of the device is a device that is one-hop closer to the fourth device among devices that are directly connected to the device.

In a possible implementation, the sending, by the processor, a first status message to a parent node of the device through the communications interface specifically includes sending, by the processor, the first status message to the parent node of the device through the communications interface based on a maintained mapping relationship, where the mapping relationship of the device is a correspondence between a data packet number of data sent by the device to the first device and a data packet number of data received from the parent node of the device.

In a possible implementation, the data receiving status information is used to instruct the fourth device to send data to the first device based on the data receiving status information.

According to a forty-second aspect, this application further provides a device, including a processor and a communications interface, where the processor is configured to first receive, through the communications interface, a first status message sent by a child node of the device, where the first status message includes or indicates data receiving status information of a first device, and then send a second status message to a parent node of the device through the communications interface based on the first status message, where the parent node of the device is a device that is one-hop closer to the fourth device among devices that are directly connected to the device, the child node of the device is a device that is one-hop farther from the fourth device among the devices that are directly connected to the device, the fourth device is connected to a core network device, and the device is connected to the core network device by the fourth device.

In a possible implementation, the sending, by the processor, a second status message to a parent node of the device through the communications interface based on the first status message specifically includes sending, by the processor, the second status message to the parent node of the device through the communications interface based on a maintained mapping relationship and the first status message, where the mapping relationship of the device is a correspondence between a data packet number of data sent by the parent node of the device to the device and a data packet number of the data sent by the device to the child node of the device.

In a possible implementation, the data status receiving information of the first device is used to instruct the fourth device to send data to the first device based on the status receiving information.

According to a forty-third aspect, this application further provides a device, where the device has a function for implementing the first device, the second device, the third device, the fourth device, the fifth device, or the sixth device in the foregoing method. The function may be implemented by hardware, for example, including a processor and a communications interface, or may be implemented by corresponding software executed by hardware. The hardware or software includes one or more modules corresponding to the foregoing function, and the module may be software and/or hardware.

According to a forty-fourth aspect, this application further provides a computer-readable storage medium, where the computer-readable storage medium stores program code for implementing the data processing method provided by any one of the foregoing aspects, or the data processing method provided by any one or more of the possible implementations in any one of the foregoing aspects, and the program code includes an executable instruction for running the data processing method provided by any one of the foregoing aspects, or the data processing method provided by any one or more of the possible implementations in any one of the foregoing aspects.

According to a forty-fifth aspect, this application further provides a computer program product including an instruction, where when the computer program product is run on a computer, the computer is enabled to perform the method in each of the foregoing aspects.

According to a forty-sixth aspect, this application provides a chip system, where the chip system includes a processor, configured for the first device to the seventh device to implement functions in the foregoing aspects, for example, generate or process data and/or information in the foregoing methods. In a possible design, the chip system further includes a memory, where the memory is configured to store a program instruction and data required by a terminal device. The chip system may include chips, or may include a chip and other discrete components.

DETAILED DESCRIPTION OF ILLUSTRATIVE EMBODIMENTS

The following clearly and completely describes the technical solutions in the embodiments of the present invention with reference to the accompanying drawings in the embodiments of the present invention.

Figure 1:
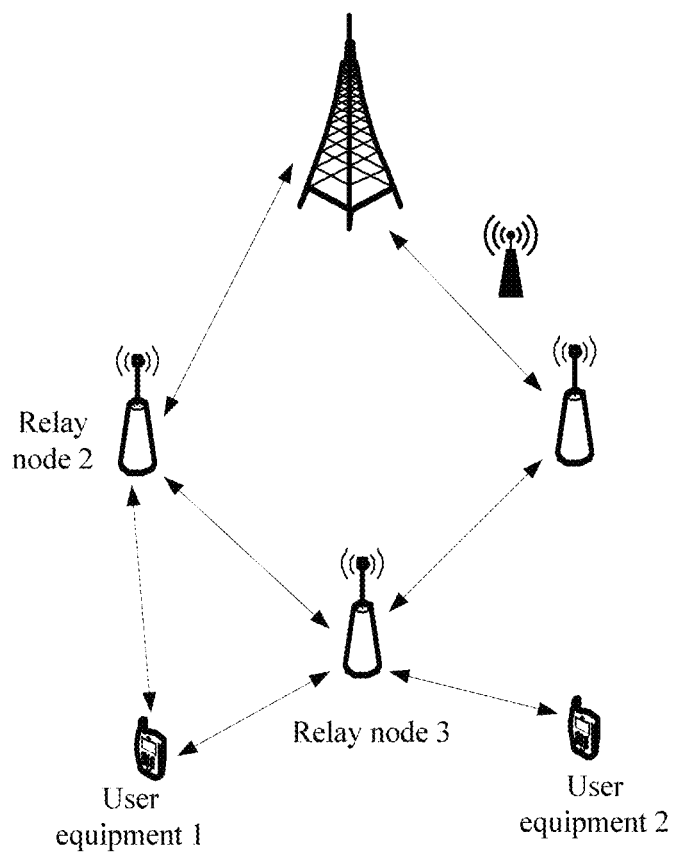
FIG. 1 is a schematic structural diagram of a network according to an embodiment of the present invention.

As shown in FIG. 1, a donor base station is connected to a core network. A link between a relay node 3 and a relay node 1 is shown by a dashed line between a relay node 3 and a relay node 1 in FIG. 1, and when quality of the link deteriorates, the relay node 3 needs to switch from the relay node 1 to a destination node, that is, a relay node 2, to keep communication, or when a link between user equipment 1 and a relay node 2 is shown by a dashed line between a relay node 2 and user equipment 1 in FIG. 1, and when quality of the link deteriorates, the user equipment 1 needs to switch from the relay node 2 to a relay node 3 to ensure quality of communication. In this case, because both a transmission path between the user equipment 1 and the donor base station, and a transmission path between the relay node 3 and the donor base station change, how to ensure that a data packet transmitted to the user equipment 1 or to user equipment accessing the relay node 3 is not lost in a switching process is a problem urgently to be resolved.

Connections between base stations and between a base station and a relay node may be air interface connections or wireless connections. Therefore, quality of a link may be determined based on a related indicator for measuring quality of air interface transmission.

The terms "first", "second", "third", "fourth", and various numbers in the embodiments of the present invention are used for distinguishing for ease of description only, and are not intended to limit the scope of the embodiments of the present invention.

In the embodiments of the present invention, a first device to a seventh device may be wireless terminals. The wireless terminal may be a device providing voice and/or data connectivity to a user, a handheld device having a wireless connection function, or another processing device connected to a wireless modem. The wireless terminal may communicate with one or more core networks by using a radio access network (such as RAN, radio access network). For example, the user equipment may be a mobile terminal, for example, a mobile phone (or referred to as a "cellar" phone) or a computer having a mobile terminal, or may be a portable, pocket-sized, handheld, computer built-in, or in-vehicle mobile apparatus, for example, a personal communications service (PCS) phone, a cordless telephone set, a Session Initiation Protocol (SIP) phone, a wireless local loop (WLL) station, or a personal digital assistant (PDA), which exchanges voice and/or data with the radio access network. Optionally, the user equipment may also be referred to as a mobile station (MS), a mobile terminal, a subscriber unit (SU), a subscriber station (SS), a mobile station (MB), a remote station (RS), an access point (AP), a remote terminal (RT), an access terminal (AT), a user terminal (UT), a user agent (UA), a terminal device (UD), or the like. This is not limited in this application.

In the embodiments of the present invention, alternatively, the first device to the seventh device may be base stations, transmission reception points (TRP), or radio remote units (RRU). The base station may be a device communicating with a terminal over an air interface in the access network by using one or more sectors. The base station may coordinate attribute management on the air interface. For example, the base station may be a base station in GSM or CDMA, such as a base transceiver station (BTS), or may be a base station in WCDMA, such as a NodeB, or may be an evolved base station in LTE, such as an eNB (evolutional NodeB, e-NodeB), or may be a base station in a 5G system, or a base station in a future network. This is not limited in this application. Optionally, the base station may be a relay device, or another network element device having a function of a base station. Downstream nodes of the second device may be some sensor nodes, or the like. This is not limited in the embodiments of the present invention.

Figure 2:
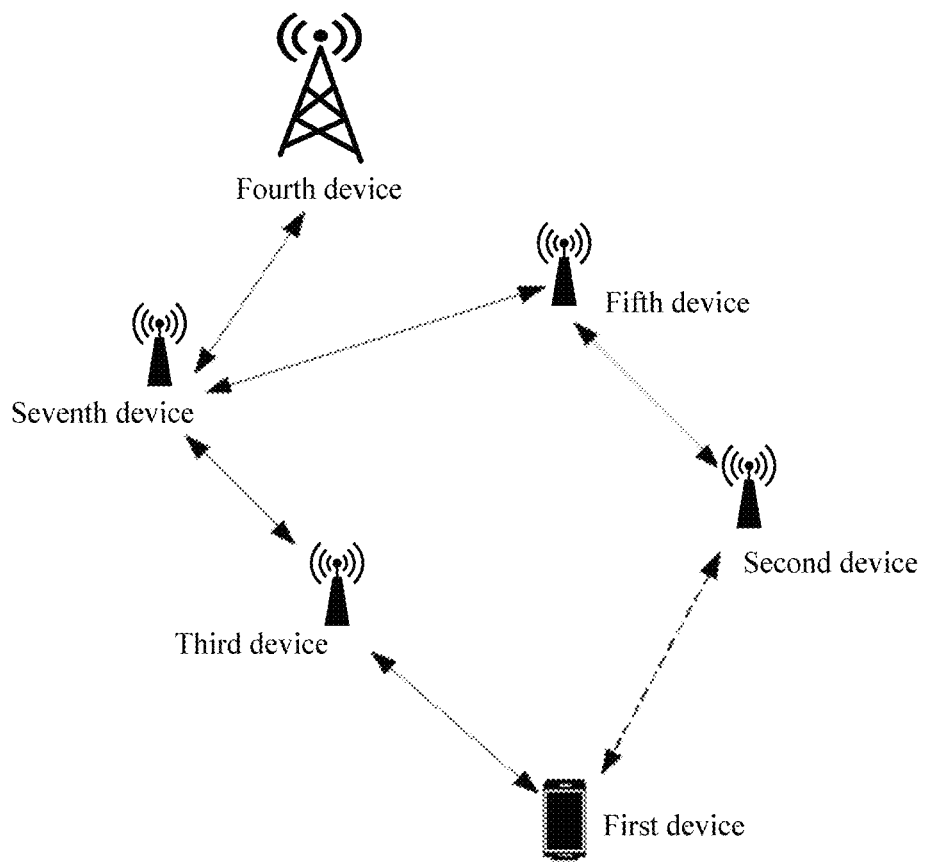
FIG. 2 is a schematic structural diagram of another network according to an embodiment of the present invention.
Figure 3:
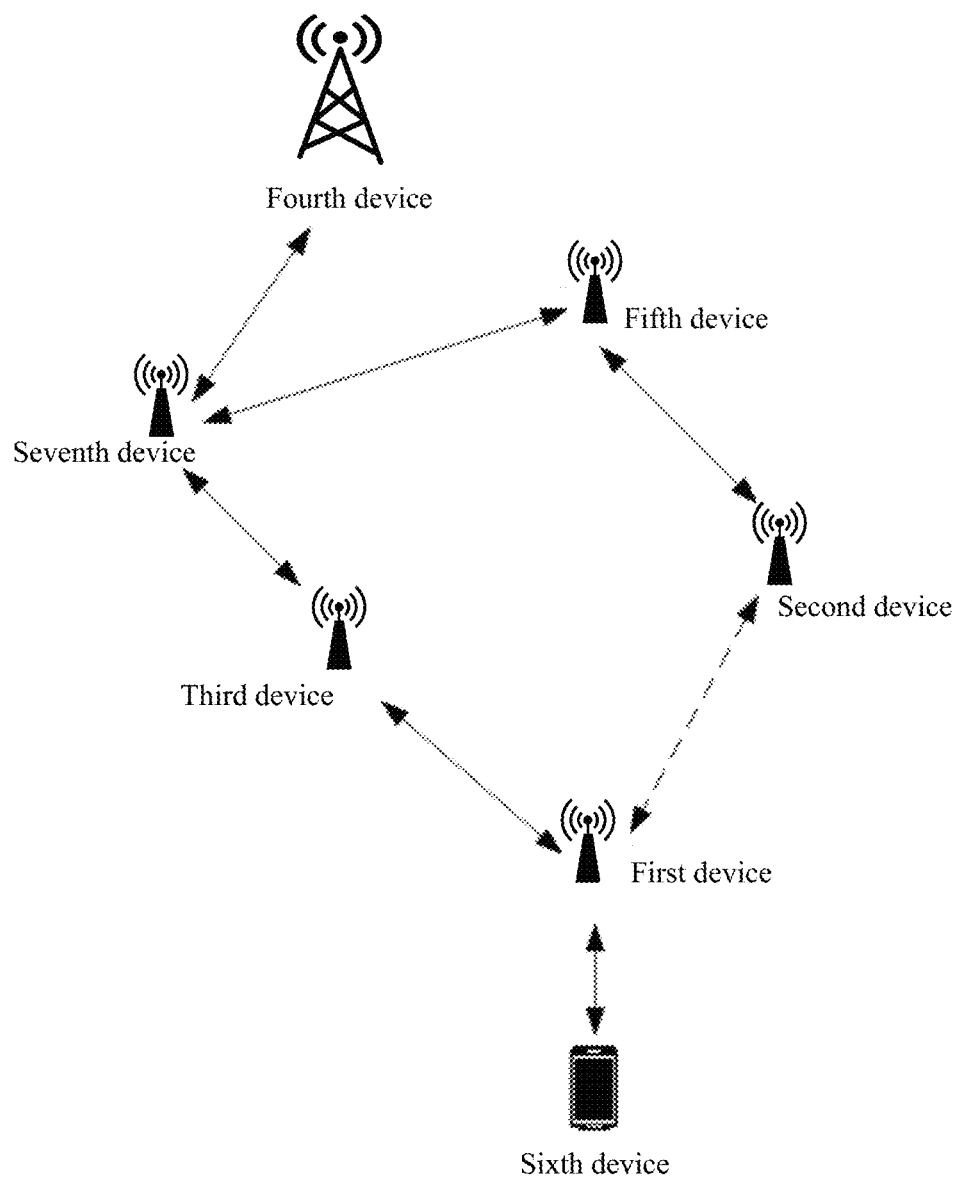
FIG. 3 is a schematic structural diagram of still another network according to an embodiment of the present invention.

To ensure that a device can receive downlink data in time after the device switches, and to avoid a packet loss problem, the embodiments of the present invention provide a solution based on a network structure shown in FIG. 2 or FIG. 3 to help avoid a data packet loss. In FIG. 2 and FIG. 3, the first device is connected to the fourth device by the second device and the third device respectively. For example, the second device to the fifth device, and the seventh device are base stations, where the fourth device is equivalent to the donor base station in FIG. 1, and may be connected to a core network device, and send data of the first device or the sixth device in the core network device to the first device or the sixth device. The fifth device is any device on a link between the second device and the third device. Optionally, the third device and the seventh device may be directly connected, or may be connected by at least one device. Because quality of a link between the first device and the second device deteriorates, the first device switches from the second device to the third device. A difference between FIG. 3 and FIG. 2 lies in that, when the first device is a network device such as a base station, the sixth device is, for example, a mobile phone, and the first device is a serving device for the sixth device. When quality of the link between the first device and the second device deteriorates, the first device may switch from the second device to the third device. Correspondingly, a transmission path between the fourth device and the sixth device also changes. The sixth device and the first device may be connected directly or may be connected by at least one device. It should be noted that, FIG. 2 and FIG. 3 are example figures provided for describing the embodiments, and cannot be used as limitations on the protection scope of this application.

The network structure to which the embodiments of the present invention are applicable may further include more devices, for example, more base stations and terminal devices, or at least one device further exists between the first device and the sixth device, or more devices may exist on a link between the seventh device and the third device in FIG. 2 and FIG. 3. In addition, a topology between devices may be a mesh or a tree or the like. However, solutions to the foregoing problems are similar. Therefore, FIG. 2 and FIG. 3 are used as examples in the embodiments of the present invention to describe how to avoid a loss of a data packet transmitted by the fourth device to the first device in FIG. 2 and how to avoid a loss of a data packet transmitted by the fourth device to the sixth device in FIG. 3.

Key implementations in the embodiments of the present invention may include the following content.

1. Based on the network structure shown in FIG. 2 or FIG. 3, after the first device switches, the second device may report data receiving status information to the fourth device, so that the fourth device retransmits data in time based on the data receiving status information, to avoid a loss of a data packet of the first device or the sixth device.

The data receiving status information reported by the second device may be reported in a manner of a status report. For example, the status report may be a Packet Data Convergence Protocol (PDCP) status report, or a Radio Link Control protocol (RLC) layer status report. If the data receiving status information is a PDCP status report, the PDCP status report may include a number of a missed first data packet, and a receiving status of a subsequent data packet is indicated by using a bitmap, where 1 indicates "received", and 0 indicates "not received", or the PDCP status report includes a number of a missed data packet and a range of numbers of consecutive missed data packets. If the data receiving status information is an RLC status report, because an RLC layer is used to indicate information about data, for example, a data packet number, which is excessively short, a transmitting RLC entity and a corresponding receiving RLC entity need to maintain a hyper frame number, that is, maintain a variable of at least one bit apart from a sequence number of a data packet, to avoid that the status receiving information indicates a much earlier data packet. For example, this is similar to maintaining a hyper frame number or a number of a data packet of a PDCP layer. The RLC status report may include a number of a missed first data packet, and a receiving status of a subsequent data packet is indicated by using a bitmap, where 1 indicates "received", and 0 indicates "not received", or the RLC status report includes a number of a missed data packet and a range of numbers of consecutive missed data packets.

For data that is not successfully received by the first device, in data sent by the fourth device to the first device through the second device before switching, the second device discards the data, or a device on a link between the fourth device and the second device after switching discards the data.

After the first device switches and before the fourth device receives the data receiving status information, the fourth device does not send data to the first device.

2. Based on the network structure shown in FIG. 3, after the first device switches, the sixth device may report data receiving status information of the sixth device to the fourth device, so that the fourth device retransmits, based on the data receiving status information, a data packet not received by the sixth device, to avoid a data packet loss.

Before the sixth device reports the data receiving status information to the fourth device, the sixth device may further receive a first message sent by the fourth device or the first device, and report the data receiving status information based on the first message. The first message may be received in a manner of a unicast message or received in a manner of a broadcast message. The first message may be dedicated signaling, or may be a PDCP control packet data protocol unit PDU, where the control PDU is used to trigger the PDCP layer to send a status report, or may be a PDCP data packet data protocol unit PDU, where the data PDU triggers, by using a reserved bit of a packet header, the PDCP layer to send a status report, or may be system information or paging, where the sixth device is triggered, in a manner of system information broadcasting or paging, to send a message of the data receiving status information.

The data receiving status information reported by the sixth device may be reported in a manner of a status report. For example, the status report may be a Packet Data Convergence Protocol (PDCP) status report, or a Radio Link Control protocol (RLC) layer status report. If the data receiving status information is a PDCP status report, the PDCP status report may include a number of a missed first data packet, and a receiving status of a subsequent data packet is indicated by using a bitmap, where 1 indicates "received", and 0 indicates "not received", or the PDCP status report includes a number of a missed data packet and a range of numbers of consecutive missed data packets. If the data receiving status information is an RLC status report, because an RLC layer is used to indicate information about data, for example, a data packet number, which is excessively short, a transmitting RLC entity and a corresponding receiving RLC entity need to maintain a hyper frame number, that is, maintain a variable of at least one bit apart from a sequence number of a data packet, to avoid that the status receiving information indicates a much earlier data packet. For example, this is similar to maintaining a hyper frame number or a number of a data packet of a PDCP layer. The RLC status report may include a number of a missed first data packet, and a receiving status of a subsequent data packet is indicated by using a bitmap, where 1 indicates "received", and 0 indicates "not received", or the RLC status report includes a number of a missed data packet and a range of numbers of consecutive missed data packets.

Optionally, for data that is not successfully received by the first device, in data sent by the fourth device to the first device through the second device before switching, the second device discards the data, or a device on a link between the fourth device and the second device after switching discards the data.

Optionally, after the first device switches and before the fourth device receives the data receiving status information, the fourth device does not send data to the sixth device.

3. Based on the network structure shown in FIG. 2 or FIG. 3, data that has been received by the second device but has not been acknowledged as received by the first device or the sixth device, in data sent by the fourth device to the first device or the sixth device, may be sent to the third device by using a data forwarding channel.

Each device on a path of the data forwarding channel may determine, by using a channel identifier or a transmission direction, a next-hop device for transmission, or each device may maintain from which channel data comes, and transmit the data by determining a channel for delivering the data from the channel. Details are described later.

After switching, the fourth device establishes the data forwarding channel by performing signaling interaction with the second device and the third device. The fifth device maintains a mapping relationship. The fifth device is a device on the link between the second device and the third device. The mapping relationship is a mapping relationship between a first channel between a parent node of the fifth device and the fifth device, and a second channel between the fifth device and a child node of the fifth device. The data carries a channel identifier, and the channel identifier is used to instruct a device receiving the data to transmit the data to a next-hop device based on the channel identifier.

By maintaining a same mapping relationship and/or a same channel identifier, a downlink channel of the data transmission channel and the data forwarding channel are the same between a parent node of the seventh device and the seventh device.

The first device switches, and the fourth device stops continuing to send a data packet to the second device, and sends an end data packet, where the end data packet may be a data packet of a GPRS tunneling protocol layer, a PDCP layer, or an RLC layer, but is not limited to the foregoing data packet.

The first device switches, and the fourth device stops continuing to send a data packet to the second device, and sends an end data packet, instructing a device of the forwarding channel to release the forwarding channel and a non-common part of the downlink transmission channel.

Data sent through the data forwarding channel is preferentially transmitted before data transmission of the downlink transmission channel. For example, the fifth device transmits data of the downlink transmission channel after receiving the end packet of the data forwarding channel.

4. Based on the network structure shown in FIG. 2 or FIG. 3, data that has been received by the second device but has not been acknowledged as received by the first device or the sixth device, in data sent by the fourth device to the first device or the sixth device may be sent to the third device based on a destination identifier carried in the data and a mapping relationship maintained by each device, and then the third device sends the forwarded data to the first device or the sixth device.

In the foregoing 1 and 2, the data receiving information is reported to the fourth device, so that the fourth device retransmits data that has been received by the second device but has not been acknowledged as received by a child node of the second device, to avoid a data packet loss problem. In the foregoing 3 and 4, data that has been received by the second device but has not been acknowledged as received by a child node of the second device is forwarded to the third device, to avoid a data packet loss problem.

In the foregoing implementations 1 to 4, when each device receives data retransmitted by the fourth device or receives data forwarded by the second device, the device needs to preferentially transmit the data, for example, may transmit other data after transmission of the data is completed, to avoid disorder of data packets received by the terminal device or a packet loss problem caused by an excessively long reception time interval between data packets. Correspondingly, each device may buffer other received data, and after the data is transmitted, transmit the other data.

To be specific, the data retransmitted by the fourth device or the data forwarded by the second device may satisfy at least one of the following conditions: the data carries a forwarding identifier, the data carries a plurality of destination identifiers, when uplink data transmitted by the first device or the sixth device to the fourth device does not carry a destination identifier, the data carries a destination identifier, a destination identifier carried in the data is a destination identifier reachable based on a mapping relationship of the device, but the data is received from a first path, and the data comes from a forwarding channel, where the first path is not a path for receiving data of the first device by the third device. Therefore, each device can confirm, based on the foregoing condition, whether data received by the device is data retransmitted by the fourth device or data forwarded by the second device.

In the following embodiments, the foregoing implementations are described in detail based on the network structure shown in FIG. 2 or FIG. 3.

Embodiment 1

This embodiment of the present invention is described based on the network structure shown in FIG. 2 or FIG. 3 and the foregoing implementation 1.

When quality of a link between a first device and a second device deteriorates, the first device may switch from the second device to a third device, and the second device reports data receiving status information to a fourth device, so that the fourth device retransmits data based on the data receiving status information. The retransmitted data is data that has been received by the second device but has not been acknowledged as received by the first device, in data sent by the fourth device to the first device through the second device. As shown in FIG. 2, the retransmitted data may be data of the first device. As shown in FIG. 3, the retransmitted data may be data of the sixth device.

Figure 4:
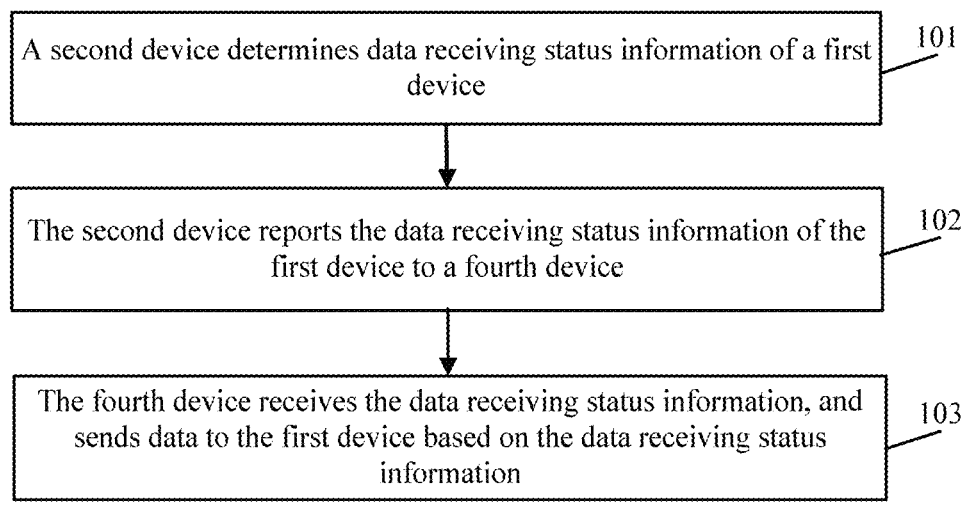
FIG. 4 is a schematic flowchart of a data processing method according to an embodiment of the present invention.

FIG. 4 is a schematic flowchart of a data processing method according to an embodiment of the present invention. As shown in FIG. 4, the data processing method may include the following steps.

101. A second device determines data receiving status information of a first device.

102. The second device reports the data receiving status information of the first device to a fourth device.

103. The fourth device receives the data receiving status information, and sends data to the first device based on the data receiving status information.

The data receiving status information is used to indicate information about first data. The first data is data that has been received by the second device but has not been acknowledged as received by the first device, in data sent by the fourth device to the second device and sent by the second device to the first device or in data sent by the fourth device to the first device. Therefore, the first data may also be referred to as data retransmitted by the fourth device based on the data receiving status information. The data sent by the fourth device to the first device based on the data receiving status information may include the first data and subsequent other data.

The data receiving status information is used to instruct the fourth device to send the data to the first device based on the data receiving status information. For example, the data receiving status information includes information about data that is in the second device and has not been acknowledged as received by the first device, such as information about a data packet number. In this case, the fourth device retransmits, to the first device through the third device, data corresponding to the data packet number.

That the second device reports the data receiving status information of the first device to a fourth device may include the following.

1021. The second device determines a first status message based on the data receiving status information of the first device.

1022. The second device sends the first status message to a parent node of the second device.

The first status message carries the data receiving status information of the first device.

1023. The parent node of the second device reports the data receiving status information of the first device to the fourth device based on the first status message.

The parent node of the second device is a device that is one-hop closer to the fourth device among devices that are directly connected to the second device. As shown in FIG. 2 or FIG. 3, the parent node of the second device is a fifth device. Optionally, the fifth device is connected to a core network device, and the fifth device is any device on a link between the second device and the fourth device.

If the fifth device is any device on the link between the second device and the fourth device, the fifth device may perform the following steps.

The fifth device receives a first status message sent by a child node of the fifth device, where the first status message carries the data receiving status information of the first device, and the fifth device sends the second status message to a parent node of the fifth device based on the first status message, where the second status message carries the data receiving status information of the first device, where the parent node of the fifth device is a device that is one-hop closer to the fourth device among devices that are directly connected to the fifth device, and the child node of the fifth device is a device that is one-hop farther from the fourth device among the devices that are directly connected to the fifth device.

As shown in FIG. 2 or FIG. 3, if the fifth device is the parent node of the second device, that the fifth device reports the data receiving status information of the first device to the fourth device based on the first status message includes the fifth device receives the first status message sent by the child node of the fifth device, that is, the second device, the fifth device sends the second status message to the parent node of the fifth device based on the first status message, and the parent node of the fifth device reports the data receiving status information of the first device to the fourth device based on the second status message.

That the fifth device sends the second status message to the parent node of the fifth device based on the first status message may include the fifth device determines the second status message based on the first status message, and the fifth device sends the second status message to the parent node of the fifth device.

Correspondingly, as shown in FIG. 2 or FIG. 3, the parent node of the fifth device may be a seventh device, where a specific execution process in which the seventh device reports the data receiving status information of the first device to the fourth device based on the second status message is the same as that of the fifth device. In this embodiment of the present invention, when each device reports the data receiving status information of the first device, the foregoing manner may be used to send a corresponding status message, until a status message carrying the data receiving status information is sent to the fourth device, so that the fourth device sends data to the first device through the third device based on the data receiving status information after switching.

In a possible implementation, that the second device sends the first status message to a parent node of the second device includes the second device sends the first status message to the parent node of the second device based on a maintained mapping relationship, where the mapping relationship is a correspondence between a data packet number of data sent by the second device to the first device and a data packet number of data received from the parent node of the second device.

As can be learned, in this implementation, each device itself maintains the mapping relationship. Correspondingly, that the parent node of the second device, such as the fifth device, determines the second status message may include the fifth device determines the second status message based on the maintained mapping relationship and the first status message, where the mapping relationship is a correspondence between a data packet number of data sent by the parent node of the fifth device to the fifth device and a data packet number of the data sent by the fifth device to the child node of the fifth device.

To be specific, the mapping relationship maintained by the fifth device includes the correspondence between a data packet number of the first data when the fifth device receives the first data and a data packet number of the first data when the fifth device sends the first data. When the fifth device determines the second status message based on the mapping relationship and the first status message, the fifth device may replace information about the data packet number of the first data when the fifth device sends the first data, in the data receiving status information in the first status message, with information about the data packet number of the first data when the fifth device receives the first data.

Figure 5:
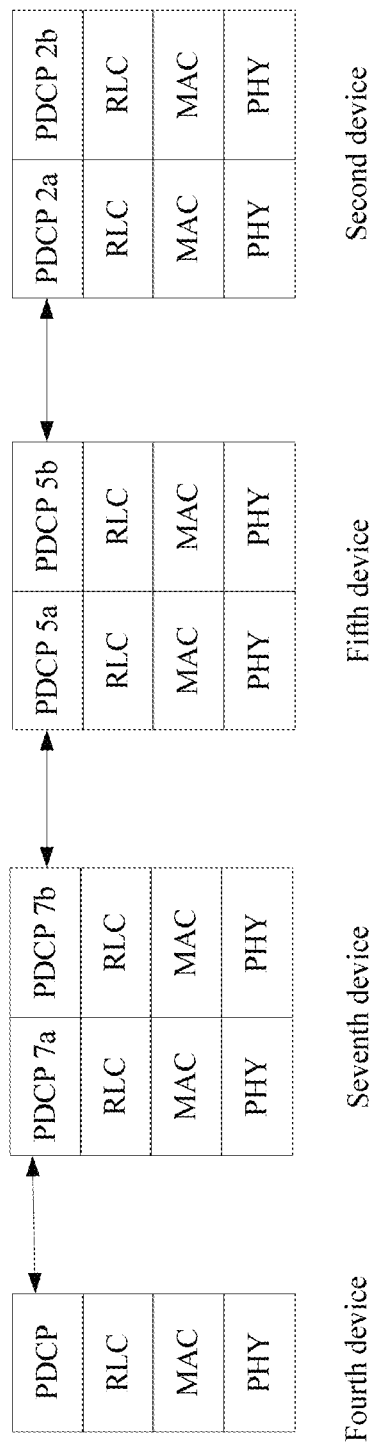
FIG. 5 is a schematic diagram for determining a status message according to an embodiment of the present invention.

For example, FIG. 5 is a schematic diagram for determining a status message according to this embodiment of the present invention. As shown in FIG. 5, for example, the status message or data receiving status information is reported by using a PDCP status report, and a protocol stack shown in FIG. 5 is used as an example. The second device may report the data receiving status information of the first device based on the mapping relationship maintained by the second device. As shown in FIG. 2, to reach the fourth device, a path for reporting the data receiving status information by the second device to the fourth device needs to pass through the second device, the fifth device, and the seventh device. In this case, each device on the path needs to maintain a correspondence between a PDCP layer COUNT value of the first data when the device receives the first data and a PDCP layer COUNT value of the first data when the device sends the first data, where the COUNT value may be the data receiving status information, or may be understood as the data packet number in the data receiving status information. For example, the information used to indicate the first data is a data packet number. There may be a plurality of implementations about how to use the data packet number to determine the data receiving status information, so that another device can identify a corresponding data packet number when receiving the data receiving status information, so as to learn the first data. For example, the data receiving status information may include a part of data packet numbers of the first data, or include a data packet number of the first data indicated by using a bitmap, or include information such as a part of data packet numbers of the first data, and a length or a range of the data packet numbers. In a word, in this embodiment of the present invention, an optional implementation about how the data receiving status information indicates the first data is not limited.

Figure 2A:
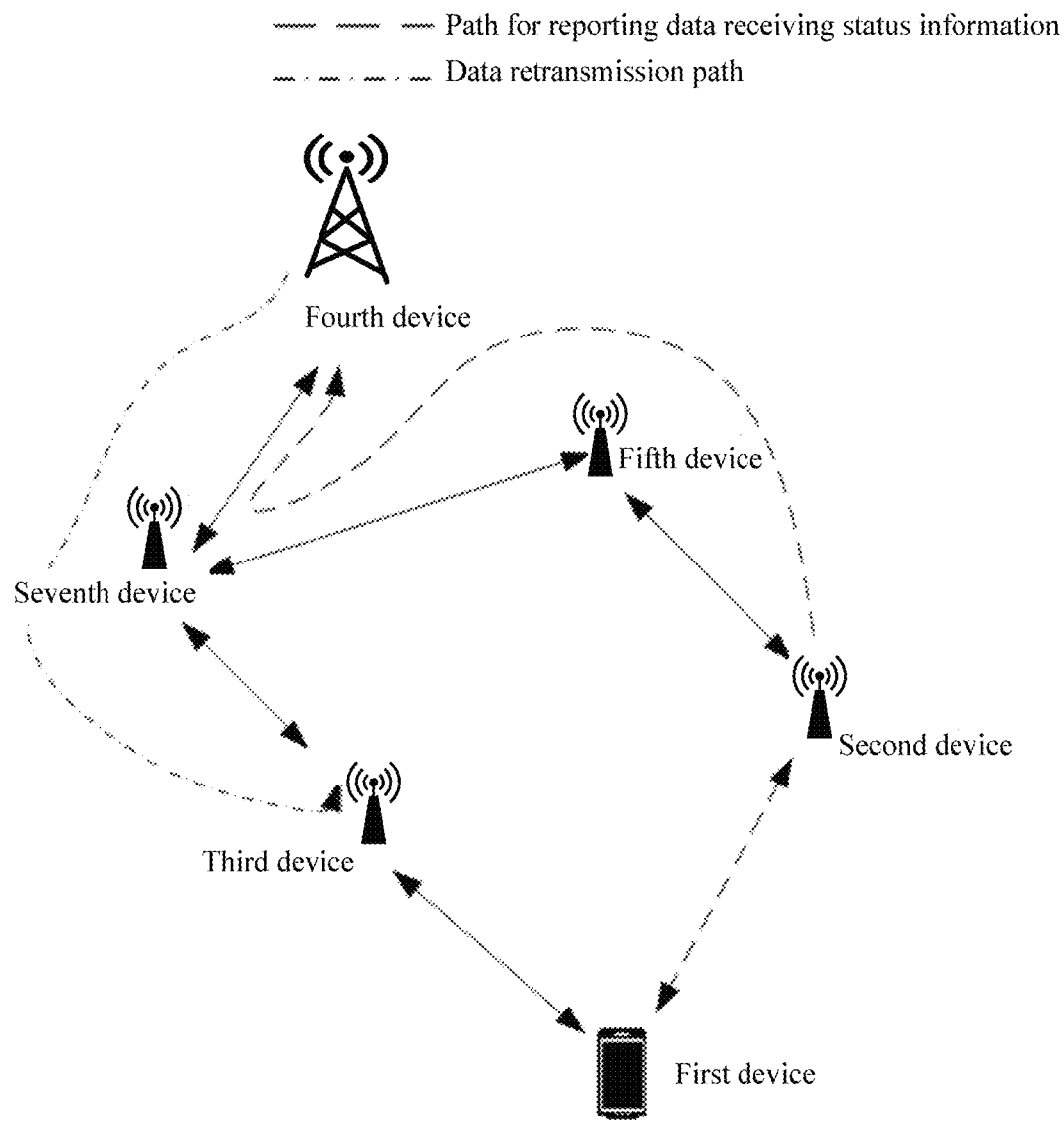
FIG. 2*a* is a schematic diagram of a path according to an embodiment of the present invention.

Using FIG. 2a as an example, a dashed line part indicates a path for reporting the data receiving status information by the second device, and a dash-dot line part indicates a path for retransmitting data to the first device based on the data receiving status information. A PDCP 2b of the second device on the path for reporting the data receiving status information by the second device needs to determine, based on a feedback of an RLC layer below the PDCP 2b, which data in the received data of the first device has not been acknowledged as received by the first device, that is, determine the first data. For example, the PDCP 2b determines that the first data is data whose COUNT values are 2, 4, and 5, a PDCP 2a determines, based on the COUNT values fed back by the PDCP 2b and a maintained mapping relationship (the mapping relationship may include a correspondence between packets whose COUNT values are 2, 4, and 5 at the PDCP 2b and packets that are received by the PDCP 2a and whose COUNT values are 5, 6, and 7), that COUNT values of the first data are 5, 6, and 7 when the second device receives the first data, the PDCP 2a may determine a PDCP status report based on the COUNT values and send the PDCP status report to the fifth device, for example, the PDCP status report carries the COUNT values 5, 6, and 7, a PDCP 5b of the fifth device receives the COUNT values 5, 6, and 7, a PDCP 5a may determine, based on a correspondence between the COUNT values of the PDCP 5b and COUNT values of the PDCP 5a, that COUNT values of the first data are 1, 2, and 3, and determine a PDCP status report based on the COUNT values, where the PDCP status report carries the COUNT values of the first data when the PDCP 2a receives the first data, that is, the COUNT values 1, 2, and 3. The rest may be inferred by analogy. The PDCP status report may be sent to the fourth device, and the fourth device retransmits the first data based on the COUNT values in the received PDCP status report.

The data receiving status information may not necessarily include all COUNT values of the first data, and only needs to carry information that can enable the device receiving the data receiving status information to recognize which data is the first data. Therefore, the data receiving status information may include a part of indication values of the first data, or include data receiving status information of the device indicated by a bitmap, or include information such as a part of indication values of the first data, or a length or a range of the part. In a word, in this embodiment of the present invention, an optional implementation about which information in the data receiving status information is used to indicate the first data is not limited.

In addition, because a device on the path for reporting the data receiving status information to the fourth device by the second device is the same as a device required for sending data to the second device by the fourth device before switching, when each device on the path receives a status message, the device may delete the previously received first data based on data receiving status information in the status message.

Figure 6:
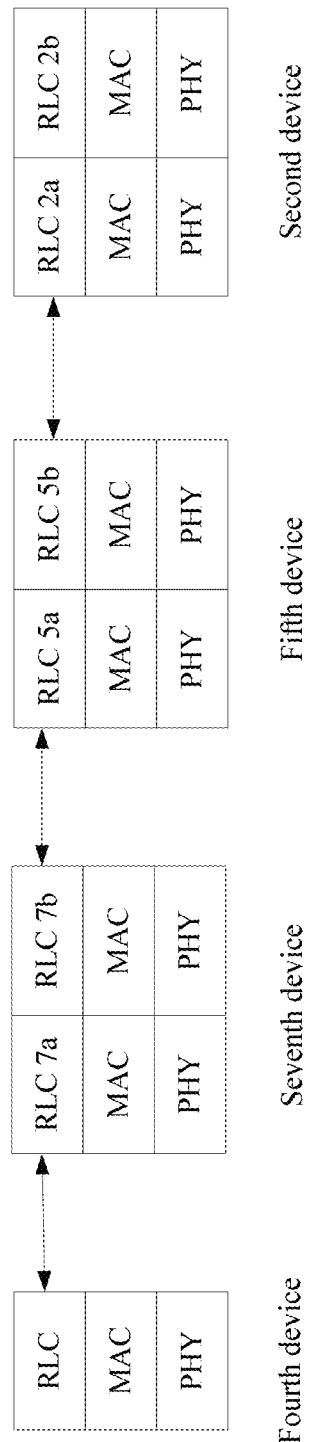
FIG. 6 is a schematic diagram for determining a status message according to an embodiment of the present invention.

For example, FIG. 6 is a schematic diagram for determining a status message according to this embodiment of the present invention. As shown in FIG. 6, for example, the status message or data receiving status information is reported by using an RLC status report. The second device may report the data receiving status information of the first device based on the mapping relationship maintained by the second device. As shown in FIG. 2, to reach the fourth device, a path for reporting the data receiving status information by the second device to the fourth device needs to pass through the second device, the fifth device, and the seventh device. In this case, each device on the path needs to maintain a mapping relationship thereof including a correspondence between an RLC layer COUNT value of the first data when the device receives the first data and a PDCP layer COUNT value of the first data when the device sends the first data, where the COUNT value may be information used to indicate the first data, for example, may be understood as the data packet number.

Alternatively, the COUNT value may be an SN value, but because the SN value is relatively short, to avoid misplacement by the RLC, the RLC needs to maintain a hyper frame number similar to that of the PDCP.

When a device on the path for reporting the data receiving status information by the second device to the fourth device determines a status message or an RLC status report, an implementation of the determining is similar to the foregoing implementation of determining a PDCP status report, where the status message in this implementation may be determined by an RLC layer of each device, and the mapping relationship may also be maintained by the RLC layer of each device.

Correspondingly, the data receiving status information in the RLC status report may not necessarily include all COUNT values of the first data either, and only needs to carry information that can enable the device receiving the data receiving status information to recognize which data is the first data. Therefore, the data receiving status information may include a part of indication values of the first data, or include data receiving status information of the device indicated by a bitmap, or include information such as a part of indication values of the first data, or a length or a range of the part. In a word, in this embodiment of the present invention, an optional implementation about which information in the data receiving status information is used to indicate the first data is not limited.

Figure 3A:
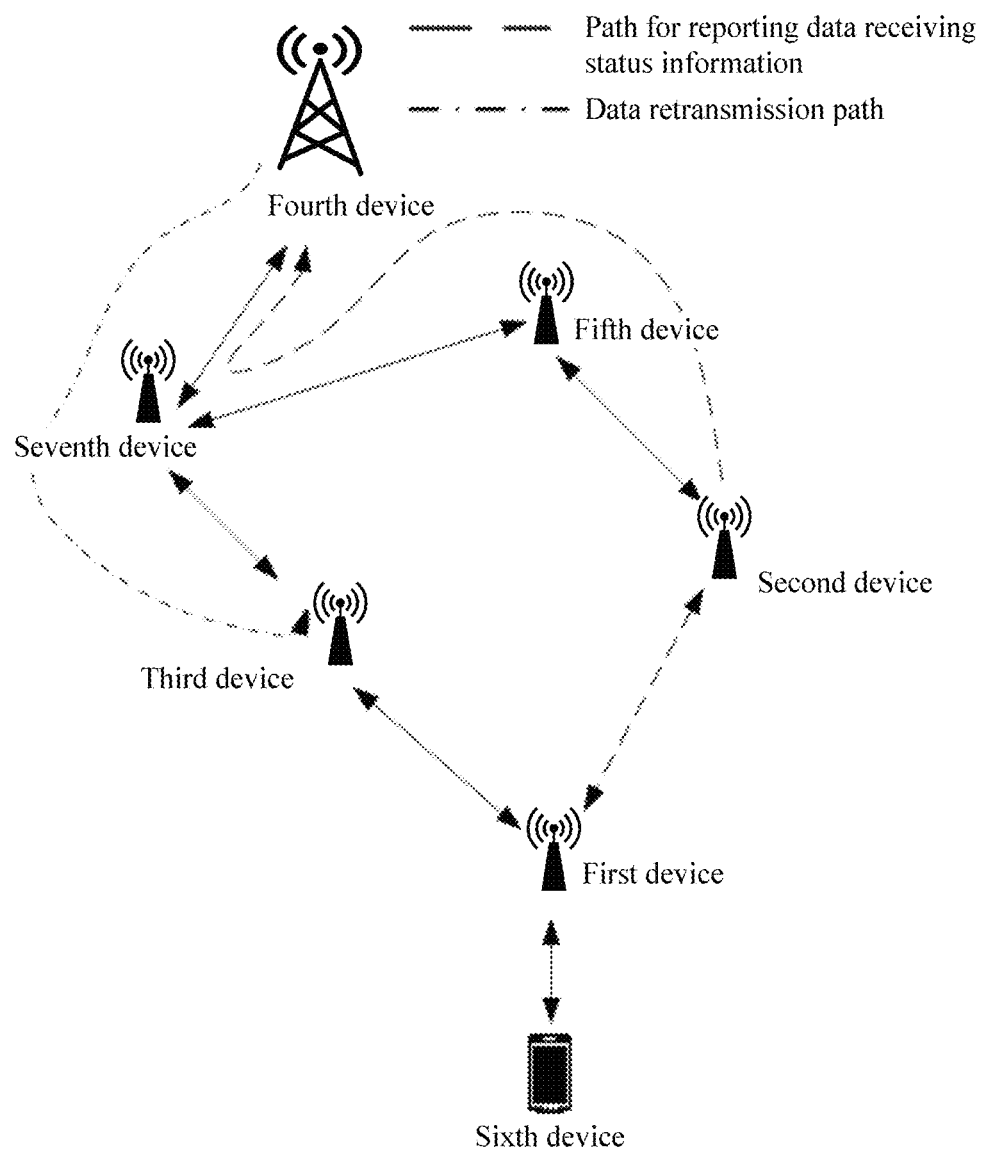
FIG. 3*a* is a schematic diagram of a path according to an embodiment of the present invention.

In FIG. 3a, a path for reporting the data receiving status information by the second device is shown by a dashed line in FIG. 3a, a path for retransmitting data by the fourth device to the first device through the third device may be shown by a solid line in FIG. 3a, and correspondingly, a path for sending data by the fourth device to the first device may be shown by a solid line in FIG. 3a. In addition, a manner of determining a status message, a PDCP status report, or an RLC status report by each device on the path for reporting the data receiving status information by the second device in FIG. 3a is the same as that in FIG. 2a. Details are not described again herein.

As can be learned, in Embodiment 1, the second device may report, to the fourth device, indication information about the data that has been received by the second device but has not been acknowledged as received by the first device or the sixth device, in the data of the first device or the sixth device. Therefore, the fourth device can know a receiving status of the sent data of the first device or the sixth device, and can retransmit, based on the indication information, the data that has not been acknowledged as received by the first device or the sixth device. Therefore, a loss of a data packet of the first device or the sixth device can be avoided.

Embodiment 2

This embodiment of the present invention is described based on the network structure shown in FIG. 3 and the foregoing implementation 2. When quality of a link between a first device and a second device deteriorates, after the first device switches from the second device to a third device, a terminal device may report data receiving status information, where the terminal device may be the sixth device in FIG. 3.

Figure 7:
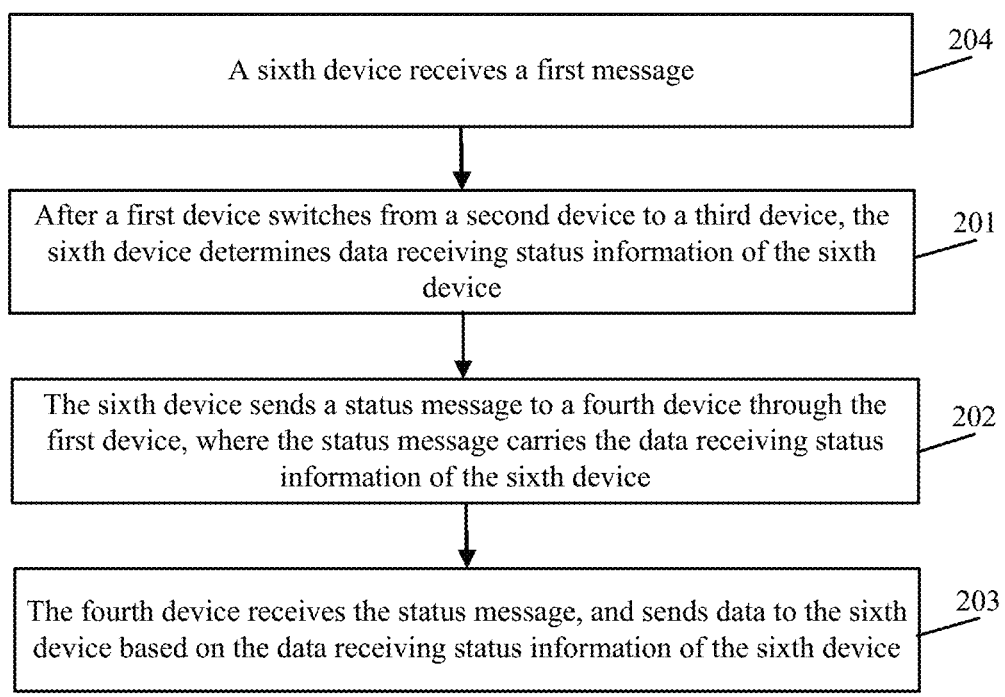
FIG. 7 is a schematic flowchart of another data processing method according to an embodiment of the present invention.

FIG. 7 is a schematic flowchart of another data processing method according to this embodiment of the present invention. As shown in FIG. 7, the data processing method may include the following steps.

201. After a first device switches from a second device to a third device, a sixth device determines data receiving status information of the sixth device.

202. The sixth device sends a status message to a fourth device through the first device, where the status message carries the data receiving status information of the sixth device.

203. The fourth device receives the status message, and sends data to the sixth device based on the data receiving status information of the sixth device.

The status message is used to instruct the fourth device to send the data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

In a possible implementation, before step 201, the data processing method shown in FIG. 7 may further include the following.

204. The sixth device receives a first message.

The first message is used to instruct the sixth device to send the data receiving status information of the sixth device to the fourth device.

In a possible implementation, before step 204, the data processing method shown in FIG. 7 may further include the first device sends the first message to the sixth device. For example, if the first device is directly connected to the sixth device, the first device may directly send the first message to the sixth device, or if the first device is connected to the sixth device by at least one device, the first device needs to send the first message to the sixth device through the intermediate at least one device. When there are a plurality of sixth devices, and the first device is directly connected to the sixth devices, the first device may send the first message in broadcast mode, so that each sixth device can receive the first message and report its own data receiving status information. When there are a plurality of sixth devices, and the first device is connected to the sixth devices by at least one device, the first device may notify information that requires a sixth device to report data receiving status information, to a serving device for the sixth device, so that the serving device sends the first message to the sixth device in broadcast mode.

In another possible implementation, before step 204, the data processing method shown in FIG. 7 may further include the fourth device sends the first message to the sixth device. For example, the fourth device may first notify the information that requires the sixth device to report the data receiving status information, to the serving device for the sixth device, so that the serving device sends the first message to the sixth device in broadcast mode. Therefore, a manner of receiving the first message by the sixth device is receiving in a manner of receiving a broadcast message.

In another possible implementation, the first message may be received in a manner of a unicast message or received in a manner of a broadcast message. The first message may be dedicated signaling, optionally may be a PDCP control packet data protocol unit PDU, where the control PDU is used to trigger a PDCP layer to send a status report, optionally may be a PDCP data packet data protocol unit PDU, where the data PDU triggers, by using a reserved bit of a packet header, a PDCP layer to send a status report, or optionally may be system information or paging, where the sixth device is triggered, in a manner of system information broadcasting or paging, to send a message of the data receiving status information.

It should be noted that, in Embodiment 1, the data receiving status information is used to indicate the data that has been received by the second device but has not been received by the first device, in the data sent by the fourth device to the first device, however, in Embodiment 2, the data receiving status information is used to indicate data that has been acknowledged as received by the sixth device, in data sent by the fourth device to the sixth device. Optionally, in Embodiment 2, the data receiving status information may be further used to indicate data that has not been acknowledged as received by the sixth device, in the data sent by the fourth device to the sixth device.

In this embodiment of the present invention, when the fourth device receives the data receiving status information, and retransmits, to the sixth device, the data that has not been received by the sixth device before the sixth device switches, each device on a link between the fourth device and the sixth device may preferentially transmit the retransmitted data, and does not transmit other downlink data until transmission is completed. When each device determines that the data that needs to be transmitted is the data retransmitted by the fourth device, the data that needs to be transmitted should include at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of a child node of the third device sending the data, and a destination identifier carried in the received data is a destination identifier reachable based on the mapping relationship, and the received data is received from a first path, where the first path is not a path for receiving data of the first device by the third device.

In this embodiment of the present invention, when the sixth device reports a status message to the fourth device, and each device on a link between the sixth device and the fourth device receives the status message, if there is data sent by the fourth device to the sixth device before switching, the data may be deleted.

As can be learned, in Embodiment, 2, after the terminal device receives the first message, the terminal device reports its own data receiving status information to the fourth device, so that the fourth device retransmits, based on the data receiving status information, the data that has been sent by the fourth device but has not been received by the terminal device. Therefore, after a relay device switches, a data packet of a terminal device directly connected to or indirectly connected to the relay device is not lost. Correspondingly, when retransmitting the data that has not been received by the terminal device, each device may preferentially send the data to avoid that data received by the terminal device is excessively disordered or that a time interval between data packets is excessively long.

Embodiment 3

Figure 8:
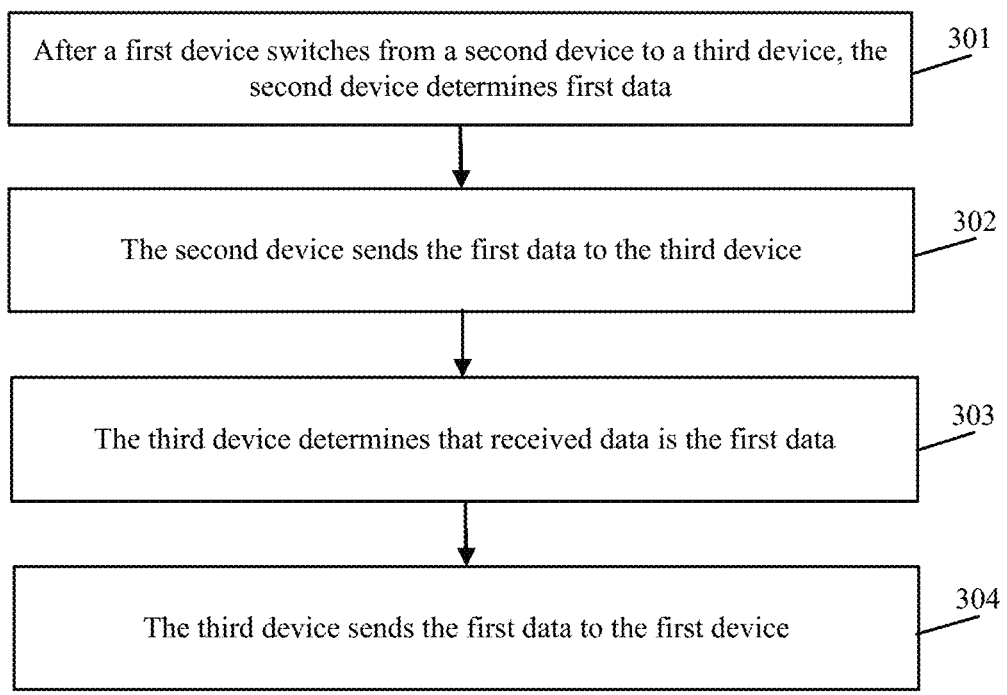
FIG. 8 is a schematic flowchart of still another data processing method according to an embodiment of the present invention.

FIG. 8 is a schematic flowchart of still another data processing method according to this embodiment of the present invention. The data processing method shown in FIG. 8 is applicable to the network structure shown in FIG. 2 or FIG. 3. In the data processing method, a second device may forward, to a third device, data that has been received by the second device but has not been acknowledged as received by a first device, in data sent by a fourth device to the first device, and the third device sends the data to the first device. As shown in FIG. 8, the data processing method includes the following steps.

301. After a first device switches from a second device to a third device, the second device determines first data.

302. The second device sends the first data to the third device.

303. The third device determines that received data is the first data.

304. The third device sends the first data to the first device.

Correspondingly, using FIG. 3 as an example, the first device may further send the first data to a sixth device.

Using FIG. 2 or FIG. 3 as an example, that the second device sends the first data to the third device in step 302 includes the second device sends the first data to a fifth device, the fifth device receives the data sent by the second device, the fifth device determines that the received data is the first data, and the fifth device sends the first data to the third device.

The fifth device is any device on a link between the second device and the third device. In addition, any device on the link between the second device and the third device may perform the steps performed by the fifth device.

If an operation of each device needs to be implemented, the data processing method shown in FIG. 8 may be further performed with reference to content described in Embodiment 4, Embodiment 5, Embodiment 6, and Embodiment 7. The following describes Embodiment 4 to Embodiment 7 in detail.

Embodiment 4

This embodiment of the present invention is described for the foregoing implementation 3 based on the network structure shown in FIG. 2 or FIG. 3.

In a possible implementation, the fourth device may establish a data transmission channel between the fourth device and the third device by using signaling, and may further establish a data forwarding channel between the second device and the third device. The data transmission channel is used to transmit data that needs to be transmitted between the fourth device and the third device. The data forwarding channel is used to transmit data that has been received by the second device but has not been acknowledged as received by the first device, in data sent by the fourth device to the first device through the second device before switching, where the data may be data of the first device, or may be data of the sixth device, or may be other data transmitted between the fourth device and the first device, and is not limited in this embodiment of the present invention. In this embodiment of the present invention, the data that has been received by the second device but has not been acknowledged as received by the first device, in the data sent by the fourth device to the first device through the second device, is referred to as first data.

Figure 2B:
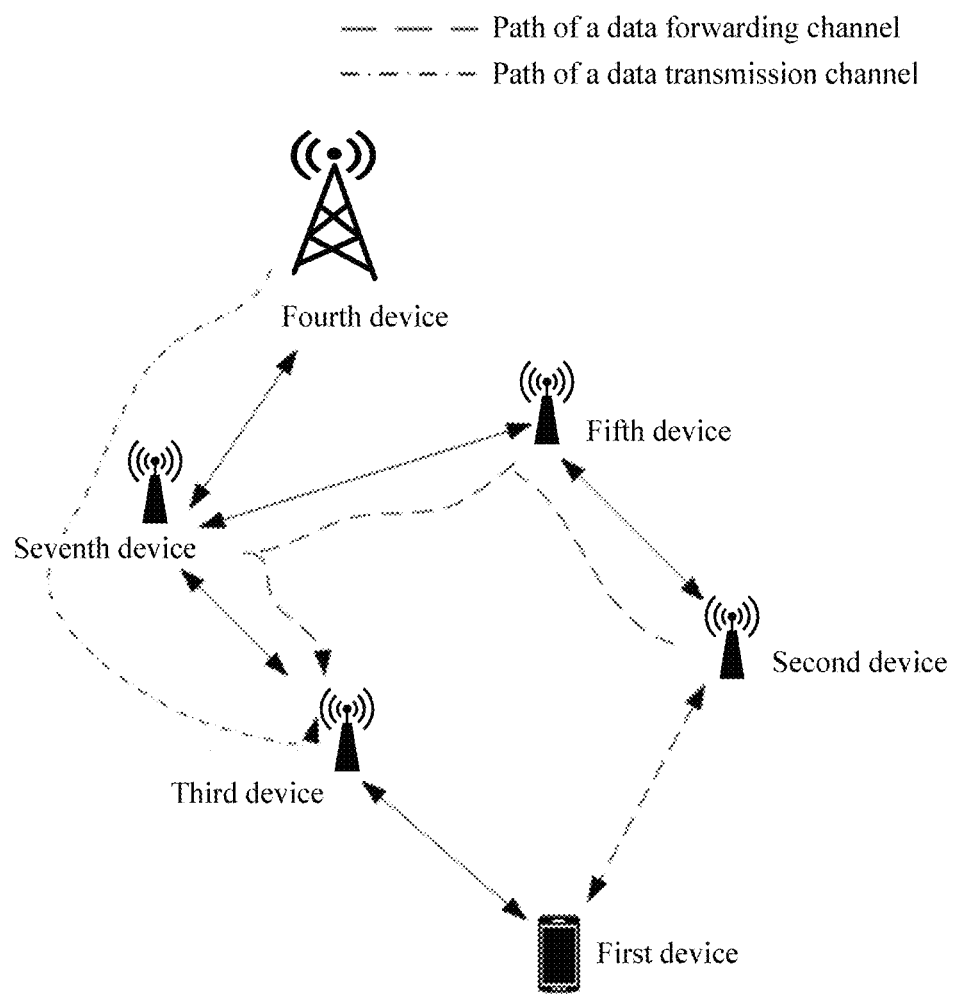
FIG. 2*b* is a schematic diagram of another path according to an embodiment of the present invention.

As shown in FIG. 2b, a path of a data transmission channel between the fourth device and the third device, established by the fourth device after the first device switches, is shown by a dash-dot line in FIG. 2b, and a path of a data forwarding channel between the second device and the third device, established by the fourth device, is shown by a dashed line connecting the second device and the third device in FIG. 2b.

When both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device. The parent node of the seventh device is a device that is directly connected to the seventh device and is one-hop closer to the fourth device. The parent node of the seventh device is a device at which a link between the second device and the fourth device intersects a link between the third device and the fourth device. As shown in FIG. 2b, a downlink channel of a data transmission channel on a path between the seventh device and the third device and a data forwarding channel on the path are the same, and may be considered as one channel.

Figure 3B:
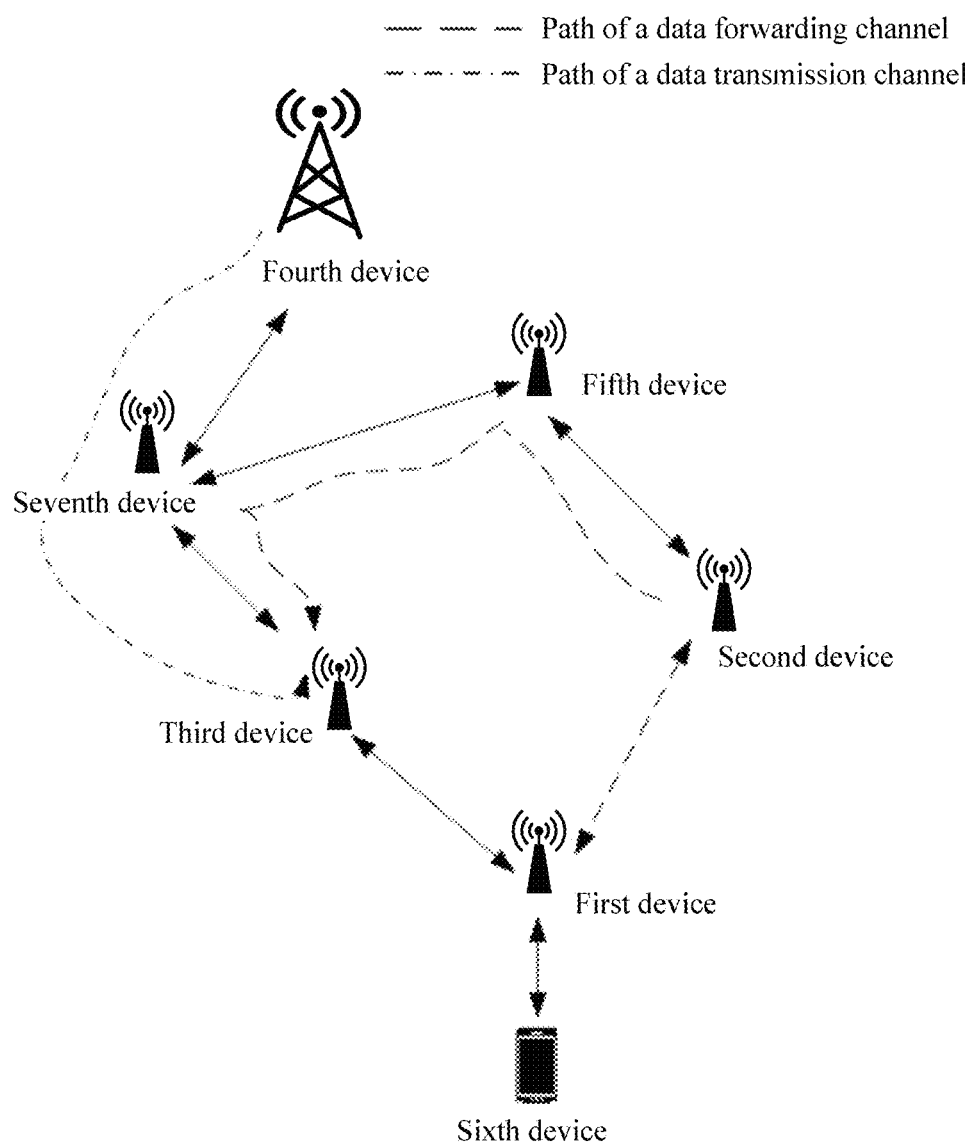
FIG. 3*b* is a schematic diagram of another path according to an embodiment of the present invention.

Correspondingly, as shown in FIG. 3b, a data transmission channel between the fourth device and the third device, established by the fourth device after the first device switches, is shown by a dashed line connecting the fourth device and the third device in FIG. 3b, and a data forwarding channel established by the fourth device is shown by a solid line connecting the second device and the third device in FIG. 3b.

When both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device. The parent node of the seventh device is a device that is directly connected to the seventh device and is one-hop closer to the fourth device. The parent node of the seventh device is a device at which a link between the second device and the fourth device intersects a link between the third device and the fourth device. As shown in FIG. 2b, a downlink channel of a data transmission channel on a path between the seventh device and the third device and a data forwarding channel on the path are the same, and may be considered as one channel.

Therefore, in this embodiment of the present invention, the second device may send, to the third device based on the data forwarding channel, the data that has been received by the second device but has not been acknowledged as received by the first device, in the data sent by the fourth device to the first device through the second device, and the third device sends the data to the first device.

Figure 9:
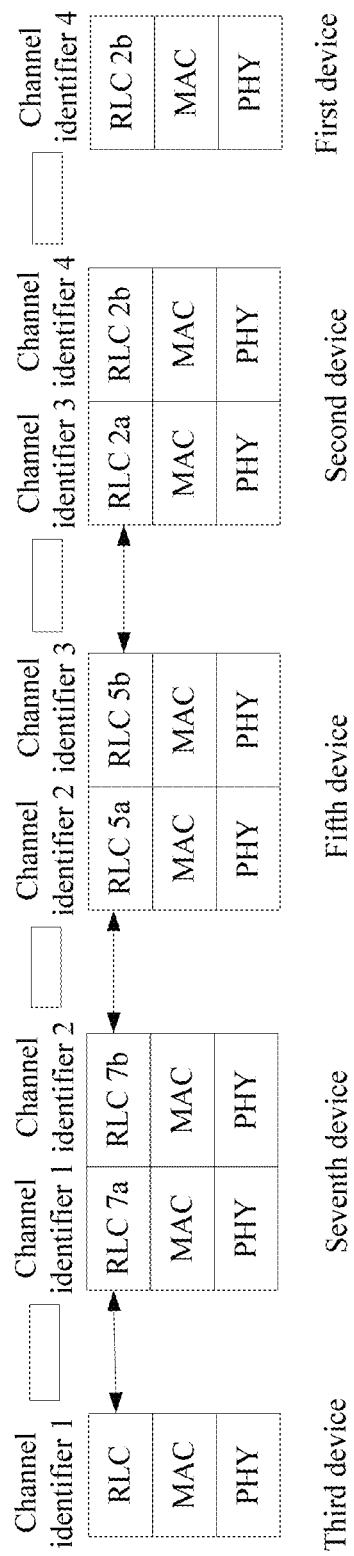
FIG. 9 is a schematic diagram of a data forwarding channel and a data transmission channel according to an embodiment of the present invention.

FIG. 9 is a schematic diagram of a data forwarding channel and a data transmission channel according to this embodiment of the present invention. After switching, the fourth device establishes a data forwarding channel by performing signaling interaction with the second device and the third device. The fifth device maintains a mapping relationship. The fifth device is a device on a link between the second device and the third device, and the mapping relationship is a mapping relationship between a first channel between a parent node of the fifth device (that is, the seventh device) and the fifth device, and a second channel between the fifth device and a child node (that is, the second device shown in FIG. 9) of the fifth device. The data carries a channel identifier, and the channel identifier is used to instruct a device receiving the data to transmit the data to a next-hop device based on the channel identifier, where a channel identifier of the first channel is a channel identifier 4, and a channel identifier of the second channel is a channel identifier 3.

By maintaining a same mapping relationship and/or a same channel identifier, the downlink channel of the data transmission channel and the data forwarding channel are the same between the parent node of the seventh device and the seventh device. To be specific, if the forwarding channel and the downlink channel of the transmission channel both pass through a link between the seventh device and the third device, all maintained channel identifiers are the channel identifier 1.

In a possible implementation, in the data processing method shown in FIG. 8, when the third device or another device on the link between the second device and the third device determines that the received data is the first data, or recognizes that the received data is the first data, the received data needs to satisfy at least one of the following items: the received data carries a forwarding identifier, the received data carries a plurality of destination identifiers, when data transmitted by the first device to the fourth device does not carry a destination identifier, the received data carries a destination identifier, according to an identifier of a next hop indicated by the mapping relationship, a destination identifier carried in the received data is not an identifier of the child node of the fifth device sending the data, a destination identifier carried in the received data is a destination identifier reachable based on the mapping relationship, and the received data is received from a first path, where the first path is not a path for receiving data of the first device by the third device, and the received data is received from a forwarding channel.

In a possible implementation, in the foregoing data processing method shown in FIG. 8, after determining the first data, the second device or another device on the link between the second device and the third device may send the first data based on the foregoing established data forwarding channel during sending. For example, the second device sends the first data to the third device based on the forwarding channel. For another example, when the second device is connected to the third device by at least one device, that the second device sends the first data to the third device based on the forwarding channel includes the second device sends the first data to a parent node or a child node of the second device based on the forwarding channel, so that the parent node or the child node of the second device sends the first data to the third device. For another example, that the fifth device sends the first data to the third device includes the fifth device sends the first data to the third device based on the forwarding channel.

The parent node of the second device is a device that is directly connected to the second device and is one-hop closer to the fourth device. The child node of the second device is a device that is directly connected to the second device and is one-hop farther from the fourth device.

In a possible implementation, all devices that receive data including the first data need to preferentially transmit the first data, and do not transmit other data until transmission of the first data is completed. For example, the second device, the third device, the first device, and another device on the link between the second device and the third device may preferentially transmit the first data, and may not transmit other data even until transmission of the first data is completed.

Embodiment 5

This embodiment of the present invention is described for the foregoing implementation 4 based on the network structure shown in FIG. 3.

In the data processing method shown in FIG. 8, that the second device sends the first data to the third device includes the second device sends the first data to the third device based on a mapping relationship, where the mapping relationship of the second device includes a destination identifier of a destination device that can be reached through the second device and an identifier of a next hop to the destination device.

In a possible implementation, the first data carries a destination identifier, and that the second device sends the first data to the third device based on a mapping relationship includes the second device sends the first data to the third device based on the destination identifier and the mapping relationship.

Further, that the second device sends the first data to the third device based on the destination identifier and the mapping relationship includes when an identifier of a next hop to the destination identifier exists in the mapping relationship of the second device, the second device sends the first data to a device identified by the next hop, so that the device identified by the next hop sends the first data to the third device, or when an identifier of a next hop to the destination identifier does not exist in the mapping relationship of the second device, the second device sends the first data to a parent node of the second device, so that the parent node of the second device sends the first data to the third device, where the parent node of the second device is a device that is one-hop closer to the fourth device among devices that are directly connected to the second device.

In a possible implementation, that the third device sends the first data to the first device includes the third device sends the first data to the first device based on a destination identifier of the first data and/or a terminal device identifier, where the destination identifier of the first data is used to indicate an identifier of a serving device for a terminal device receiving the first data, and the terminal device identifier is used to indicate an identifier of the terminal device receiving the first data. For example, in FIG. 3, the destination identifier of the first data is an identifier of the first device, and the terminal device identifier is an identifier of the sixth device.

Correspondingly, that the fifth device sends the first data to the third device based on a mapping relationship includes when an identifier of a next hop to the destination identifier exists in the mapping relationship of the fifth device, the fifth device sends the first data to a device identified by the next hop, so that the device identified by the next hop sends the first data to the third device, or when an identifier of a next hop to the destination identifier does not exist in the mapping relationship of the fifth device, the fifth device sends the first data to a parent node of the fifth device, so that a device identified by the next hop sends the first data to the third device, where the parent node of the fifth device is a device that is one-hop closer to the fourth device among devices that are directly connected to the fifth device.

When the fifth device determines that the received data is the first data, if the fifth device is a device on a path between the fourth device and the second device, that the fifth device determines that the received data is the first data may include the fifth device determines the first data in data received from a child node of the fifth device, or if the fifth device is a device on a path between the fourth device and the third device, that the fifth device determines that the received data is the first data may include the fifth device determines the first data in data received from the parent node of the fifth device, where the child node of the fifth device is a device that is one-hop farther from the fourth device among the devices that are directly connected to the fifth device, and the parent node of the fifth device is a device that is one-hop closer to the fourth device among the devices that are directly connected to the fifth device.

In this embodiment of the present invention, alternatively, that the third device determines that the received data is the first data may be that the third device determines the first data in data received from a child node of the third device.

In this embodiment of the present invention, the destination identifier carried in the first data does not change before and after the first device switches. Therefore, when the third device and a device on the path between the second device and the third device determine that the received data is the first data, the received data needs to satisfy at least one of the following items: according to an identifier of a next hop indicated by the mapping relationship, a destination identifier carried in the received data is not an identifier of the child node of the third device sending the data, and a destination identifier carried in the received data is a destination identifier reachable based on the mapping relationship, and the received data is received from a first path, where the first path is not a path for receiving data of the first device by the third device.

As can be learned, in this embodiment of the present invention, when the second device forwards the first data to the third device, the second device, the third device, and another device on the link between the second device and the third device may determine the first data in the foregoing related implementation, and forward the first data based on the maintained mapping relationship and the destination identifier of the first data. After switching, the mapping relationship maintained by the third device includes the destination identifier of the first data, so that the first data can be sent to the sixth device.

In a possible implementation, all devices that receive data including the first data need to preferentially transmit the first data, and do not transmit other data until transmission of the first data is completed. For example, the second device, the third device, the first device, and another device on the link between the second device and the third device may preferentially transmit the first data, and may not transmit other data even until transmission of the first data is completed.

Embodiment 6

This embodiment of the present invention is described for the foregoing implementation 4 based on the network structure shown in FIG. 3.

A difference between this embodiment of the present invention and Embodiment 5 lies in that, after the second device determines the first data, the second device may add a forwarding identifier to the destination identifier of the first data to obtain a second destination identifier. For example, assuming that an identifier of the first device is R1, and the added forwarding identifier is an identifier R3 of the third device, and a terminal identifier of the sixth device is UE_ID, the second destination identifier of the first data is (R1, R3, UE_ID).

A difference between this embodiment of the present invention and Embodiment 5 further lies in that, all of the third device, a device on the link between the second device and the third device, and a device on a link between the third device and the sixth device may determine the first data by determining whether the received data carries the forwarding identifier. After the first data is determined, the devices still send the first data based on the mapping relationship and the destination identifier of the first data in Embodiment 5 during sending. Details are not described again herein.

Embodiment 7

This embodiment of the present invention is described for the foregoing implementation 4 based on the network structure shown in FIG. 2 and with reference to the data processing method shown in FIG. 8.

In this embodiment of the present invention, the first data carries a first destination identifier. The data processing method shown in FIG. 8 further includes the second device updates the first destination identifier to a second destination identifier. Optionally, that the second device updates the first destination identifier to a second destination identifier includes the second device adds an identifier of the third device to the first destination identifier to obtain the second destination identifier, or the second device changes the first destination identifier to an identifier of the third device to obtain the second destination identifier, or the second device adds a forwarding identifier to the first destination identifier to obtain the second destination identifier, where the forwarding identifier is used to indicate data forwarding.

A terminal device identifier carried in the first data may be unique or may not be unique in a range connected to the fourth device. If the terminal device identifier is unique, the terminal device identifier carried in the first data before and after switching may not change. If the terminal device identifier is not unique, the terminal device identifier carried in the first data before and after switching also needs to be changed.

For example, if an identifier of a terminal device covered by the fourth device is unique, assuming that an identifier of the first device is R1, and the identifier of the third device is R3, and the first destination identifier of the first data is R1, and the terminal device identifier is UE_ID, the second device changes the first destination identifier to the identifier of the third device. In this case, the destination identifier of the first data is R3, and the terminal device identifier remains unchanged. If an identifier of a terminal device covered by the fourth device is not unique, the terminal device identifier of the first data further needs to be changed. For another example, if an identifier of a terminal device covered by the fourth device is unique, assuming that an identifier of the first device is R1, and the identifier of the third device is R3, and the first destination identifier of the first data is R1, and the terminal device identifier is UE_ID, the second device adds the identifier of the third device to the first destination identifier. In this case, the destination identifier of the first data is (R3, R1), and the terminal device identifier remains unchanged. If an identifier of a terminal device covered by the fourth device is not unique, the terminal device identifier of the first data further needs to be changed.

In the data processing method shown in FIG. 8, that the second device sends the first data to the third device includes: the second device sends the first data to the third device based on a mapping relationship, where the mapping relationship of the second device includes a destination identifier of a destination device that can be reached through the second device and an identifier of a next hop to the destination device.

Correspondingly, that the second device sends the first data to the third device based on a mapping relationship includes the second device sends the first data to the third device based on the second destination identifier and the mapping relationship.

Optionally, that the second device sends the first data to the third device based on the second destination identifier and the mapping relationship includes when an identifier of a next hop to the second destination identifier exists in the mapping relationship of the second device, the second device sends the first data to a device identified by the next hop, so that the device identified by the next hop sends the first data to the third device, or when an identifier of a next hop to the second destination identifier does not exist in the mapping relationship of the second device, the second device sends the first data to a parent node of the second device, so that the parent node of the second device sends the first data to the third device, where the parent node of the second device is a device that is one-hop closer to the fourth device among devices that are directly connected to the second device.

Correspondingly, when the third device and a device between the second device and the third device determine that the received data is the first data, the received data satisfies at least one of the following items: the received data carries a forwarding identifier, the received data carries a plurality of destination identifiers, and when uplink data transmitted by the first device to the fourth device does not carry a destination identifier, the received data carries a destination identifier.

Correspondingly, when the third device and a device on the link between the second device and the third device determine that the received data is the first data, the first data may be sent based on a mapping relationship, and the second destination identifier and the terminal device identifier that are carried in the first data. For example, when an identifier of a next hop to the second destination identifier exists in a mapping relationship of the fifth device, the fifth device sends the first data to a device identified by the next hop, so that the device identified by the next hop sends the first data to the third device, or when an identifier of a next hop to the second destination identifier does not exist in a mapping relationship of the fifth device, the fifth device sends the first data to a parent node of the fifth device, so that the device identified by the next hop sends the first data to the third device, where the parent node of the fifth device is a device that is one-hop closer to the fourth device among devices that are directly connected to the fifth device. When receiving the first data, the third device may send the first data to the first device based on the terminal device identifier in the first data.

In a possible implementation, all devices that receive data including the first data need to preferentially transmit the first data, and do not transmit other data until transmission of the first data is completed. For example, the second device, the third device, the first device, and another device on the link between the second device and the third device may preferentially transmit the first data, and may not transmit other data even until transmission of the first data is completed.

The foregoing implementations 1 to 4 are described in detail above with reference to the network structure shown in FIG. 2 or FIG. 3. The following describes structures of devices used in the foregoing embodiments.

Figure 10:
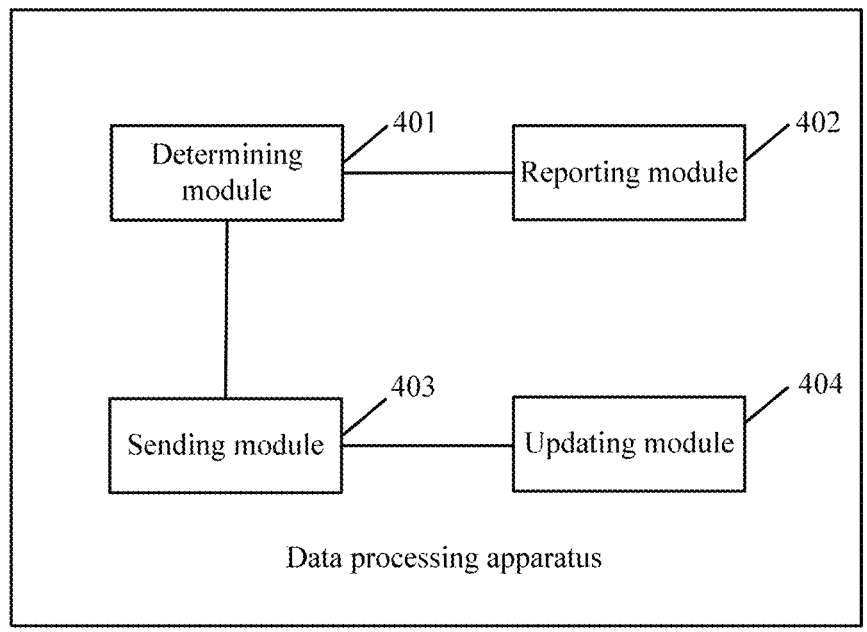
FIG. 10 is a schematic structural diagram of a data processing apparatus according to an embodiment of the present invention.

FIG. 10 is a schematic structural diagram of a data processing apparatus according to an embodiment of the present invention. The data processing apparatus shown in FIG. 10 may be disposed in the second device in the foregoing implementations or embodiments, and the data processing apparatus may include a determining module 401, configured to determine data receiving status information of a first device when the first device switches from the second device to a third device, and a reporting module 402, configured to report the data receiving status information of the first device, where the data receiving status information is used to instruct the fourth device to send data to the first device based on the data receiving status information.

In a possible implementation, the data receiving status information is used to indicate information about data that has been received by the second device but has not been acknowledged as received by the first device, in data sent by the fourth device to the second device and sent by the second device to the first device or in data sent by the fourth device to the first device.

In a possible implementation, the fourth device is connected to a core network device, and the second device and the third device are respectively connected to the core network device by the fourth device.

In a possible implementation, when at least one device exists on a link between the second device and the fourth device, the reporting the data receiving status information of the first device by the reporting module is specifically sending a first status message to a parent node of the second device, so that the parent node of the second device reports the data receiving status information of the first device to the fourth device based on the first status message, where the first status message carries the data receiving status information of the first device, and the parent node of the second device is a device that is one-hop closer to the fourth device among devices that are directly connected to the second device.

In a possible implementation, the sending a first status message to a parent node of the second device by the reporting module is specifically sending the first status message to the parent node of the second device based on a maintained mapping relationship, where the mapping relationship of the second device is a correspondence between a data packet number of data sent by the second device to the first device and a data packet number of data received from the parent node of the second device.

Optionally, for the implementations 3 and 4, in the data processing apparatus, the determining module 401 is further configured to determine first data after the first device switches from the second device to the third device, and a sending module 403 is configured to send the first data to the third device, so that the third device sends the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

The sending the first data to the third device by the sending module is specifically sending the first data to the third device based on a data forwarding channel, where the forwarding channel is a channel from the second device to the third device, established by the fourth device by using signaling, and used to forward the first data.

When the second device is connected to the third device by at least one device, the sending the first data to the third device based on a forwarding channel by the sending module is specifically sending the first data to a parent node or a child node of the second device based on the forwarding channel, so that the parent node or the child node of the second device sends the first data to the third device, where the parent node of the second device is a device that is one-hop closer to the fourth device among devices that are directly connected to the second device, and the child node of the second device is a device that is one-hop farther from the fourth device among the devices that are directly connected to the second device.

The sending the first data to the third device by the sending module is specifically sending the first data to the third device based on a mapping relationship, where the mapping relationship of the second device includes a destination identifier of a destination device that can be reached through the second device and an identifier of a next hop to the destination device.

The first data carries a first destination identifier, and the apparatus further includes an updating module 404, configured to update the first destination identifier to a second destination identifier, and the sending the first data to the third device based on a mapping relationship by the sending module is specifically sending the first data to the third device based on the second destination identifier and the mapping relationship.

The sending the first data to the third device based on the second destination identifier and the mapping relationship by the sending module is specifically when an identifier of a next hop to the second destination identifier exists in the mapping relationship of the second device, sending the first data to a device identified by the next hop, so that the device identified by the next hop sends the first data to the third device, or when an identifier of a next hop to the second destination identifier does not exist in the mapping relationship of the second device, sending the first data to a parent node of the second device, so that the parent node of the second device sends the first data to the third device, where the parent node of the second device is a device that is one-hop closer to the fourth device among devices that are directly connected to the second device.

The updating the first destination identifier to a second destination identifier by the updating module is specifically adding an identifier of the third device to the first destination identifier to obtain the second destination identifier, or changing the first destination identifier to an identifier of the third device to obtain the second destination identifier, or adding a forwarding identifier to the first destination identifier to obtain the second destination identifier, where the forwarding identifier is used to indicate data forwarding.

The first data carries a first destination identifier, and the sending the first data to the third device based on a mapping relationship by the sending module is specifically sending the first data to the third device based on the first destination identifier and the mapping relationship.

The sending the first data to the third device based on the first destination identifier and the mapping relationship by the second device includes when an identifier of a next hop to the first destination identifier exists in the mapping relationship of the second device, sending, by the second device, the first data to a device identified by the next hop, so that the device identified by the next hop sends the first data to the third device, or when an identifier of a next hop to the first destination identifier does not exist in the mapping relationship of the second device, sending, by the second device, the first data to a parent node of the second device, so that the parent node of the second device sends the first data to the third device, where the parent node of the second device is a device that is one-hop closer to the fourth device among devices that are directly connected to the second device.

A priority of sending the first data by the second device is higher than a priority of sending second data by the second device, and the second data is downlink data sent by the fourth device to the first device after switching.

Figure 11:
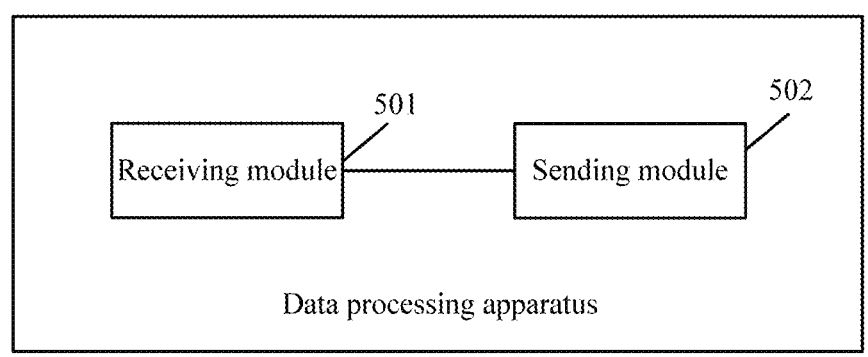
FIG. 11 is a schematic structural diagram of another data processing apparatus according to an embodiment of the present invention.

FIG. 11 is a schematic structural diagram of another data processing apparatus according to an embodiment of the present invention. The data processing apparatus may be disposed in a fifth device, and may execute related functions of the fifth device in the foregoing embodiments or implementations. The data processing apparatus is disposed in the fifth device, and the data processing apparatus includes a receiving module, configured to receive a first status message sent by a child node of the fifth device, where the first status message carries data receiving status information of a first device, and a sending module, configured to send a second status message to a parent node of the fifth device based on the first status message, where the second status message carries the data receiving status information of the first device, where the parent node of the fifth device is a device that is one-hop closer to the fourth device among devices that are directly connected to the fifth device, the child node of the fifth device is a device that is one-hop farther from the fourth device among the devices that are directly connected to the fifth device, the fourth device is connected to a core network device, and a fifth device is connected to the core network device by the fourth device.

The sending the second status message to a parent node of the fifth device based on the first status message by the sending module is specifically sending the second status message to the parent node of the fifth device based on a maintained mapping relationship and the first status message, where the mapping relationship of the fifth device is a correspondence between a data packet number of data sent by the parent node of the fifth device to the fifth device and a data packet number of the data sent by the fifth device to the child node of the fifth device.

The data status receiving information of the first device is used to instruct the fourth device to send data to the first device based on the status receiving information.

Figure 12:
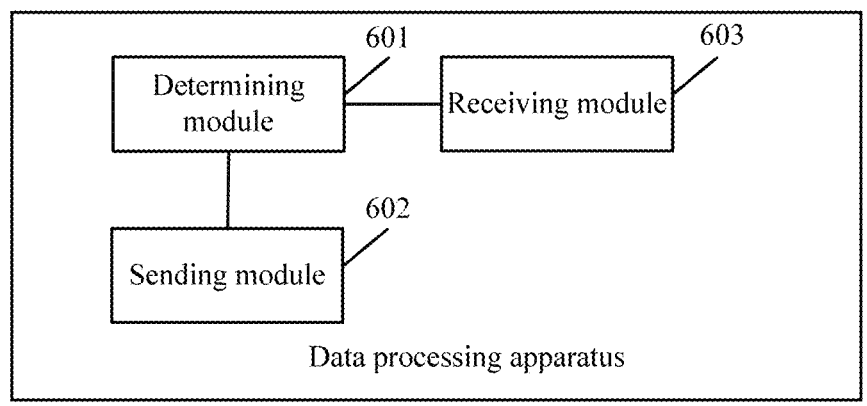
FIG. 12 is a schematic structural diagram of still another data processing apparatus according to an embodiment of the present invention.

FIG. 12 is a schematic structural diagram of still another data processing apparatus according to an embodiment of the present invention. The data processing apparatus may be disposed in a sixth device, and may execute related functions of the sixth device in the foregoing embodiments or implementations. The data processing apparatus is disposed in the sixth device, and the data processing apparatus includes a determining module 601, configured to determine data receiving status information after a first device switches from a second device to a third device, and a sending module 602, configured to send a status message to a fourth device through the first device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

The data receiving status information is used to indicate data that has been acknowledged as received by the sixth device, in data sent by the fourth device to the sixth device, or used to indicate data that has not been received by the sixth device, in data sent by the fourth device to the sixth device.

The apparatus further includes a receiving module 603, configured to receive a first message, where the first message is used to instruct the sixth device to send the data receiving status information to the fourth device.

The first message is sent by the fourth device to the sixth device.

The first message is sent by the first device to the sixth device.

The first message is received in a form of a broadcast message.

Figure 13:
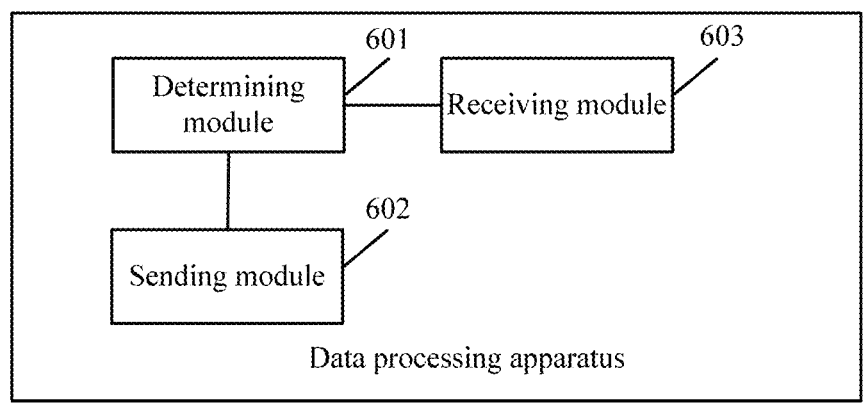
FIG. 13 is a schematic structural diagram of still another data processing apparatus according to an embodiment of the present invention.

FIG. 13 is a schematic structural diagram of still another data processing apparatus according to an embodiment of the present invention. The data processing apparatus may be disposed in a fourth device, and may execute related functions of the fourth device in the foregoing embodiments or implementations. The data processing apparatus is disposed in the fourth device, and the data processing apparatus includes a sending module 701, configured to send a first message to a sixth device when a first device switches from a second device to a third device, where the first message is used to instruct the sixth device to send data receiving status information to the fourth device, and a receiving module 702, configured to receive a status message sent by the sixth device, where the status message carries the data receiving status information of the sixth device, where the sending module 701 is further configured to send data to the sixth device based on the data receiving status information of the sixth device, where the fourth device is connected to a core network device, the second device and the third device are respectively connected to the core network device by the fourth device, and the sixth device is directly connected to the first device or connected to the first device by at least one device.

The data receiving status information is used to indicate data that has been acknowledged as received by the sixth device, in data sent by the fourth device to the sixth device, or used to indicate data that has not been received by the sixth device, in data sent by the fourth device to the sixth device.

The first message is sent in broadcast mode.

Figure 14:
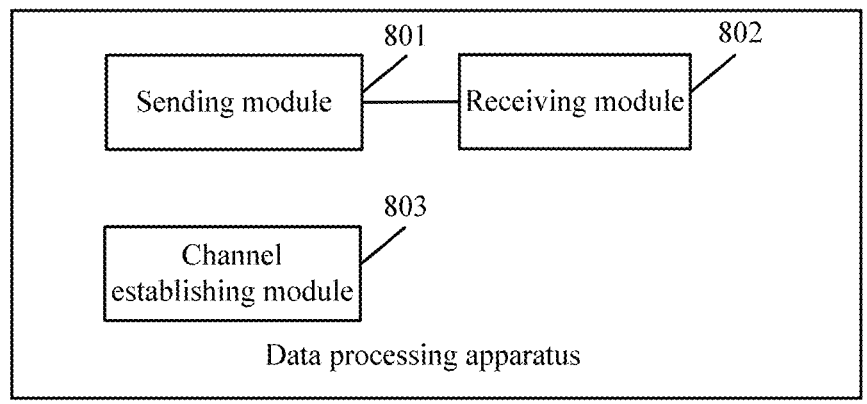
FIG. 14 is a schematic structural diagram of still another data processing apparatus according to an embodiment of the present invention.

FIG. 14 is a schematic structural diagram of still another data processing apparatus according to an embodiment of the present invention. The data processing apparatus may be disposed in a fourth device, and may execute related functions of the fourth device in the foregoing embodiments or implementations. The data processing apparatus is disposed in the fourth device, and the data processing apparatus includes a sending module 801, configured to send a first message to a sixth device when a first device switches from a second device to a third device, where the first message is used to instruct the sixth device to send data receiving status information to the fourth device, and a receiving module 802, configured to receive a status message sent by the sixth device, and send the status message to the fourth device, where the status message carries the data receiving status information of the sixth device, where the status message is used to instruct the fourth device to send data to the sixth device based on the data receiving status information of the sixth device, the fourth device is connected to a core network device, the second device and the third device are respectively connected to the core network device by the fourth device, and the sixth device is directly connected to the first device or connected to the first device by at least one device.

The data receiving status information is used to indicate data that has been acknowledged as received by the sixth device, in data sent by the fourth device to the sixth device, or used to indicate data that has not been received by the sixth device, in data sent by the fourth device to the sixth device.

The first message is sent in broadcast mode.

Optionally, for the foregoing implementation 3, the data processing apparatus further includes a channel establishing module 803, configured to after a first device switches from a second device to a third device, establish a data transmission channel between the fourth device and the third device by using signaling, and establish a data forwarding channel from the second device to the third device by using signaling, where the fourth device is connected to a core network device, and the second device and the third device are respectively connected to the core network device by the fourth device.

When both a downlink channel of the data transmission channel and the data forwarding channel include a path between a parent node of a seventh device and the seventh device, the downlink channel of the data transmission channel and the data forwarding channel are the same on the path between the parent node of the seventh device and the seventh device, and the parent node of the seventh device is a device that is one-hop closer to the fourth device among devices that are directly connected to the seventh device.

The parent node of the seventh device is a device that is passed through by both a link between the second device and the fourth device and a link between the third device and the fourth device.

Figure 15:
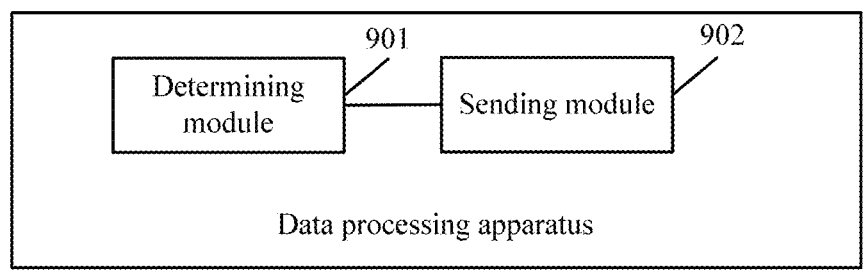
FIG. 15 is a schematic structural diagram of still another data processing apparatus according to an embodiment of the present invention.

FIG. 15 is a schematic structural diagram of still another data processing apparatus according to an embodiment of the present invention. The data processing apparatus may be disposed in a third device, and may execute related functions of the third device in the foregoing embodiments or implementations. The data processing apparatus is disposed in the third device, and the data processing apparatus includes a determining module 901, configured to determine that received data is first data when a first device switches from a second device to the third device, and a sending module 902, configured to send the first data to the first device, where the first data is data that has been received by the second device but has not been acknowledged as received by the first device, in data sent by the fourth device to the first device through the second device, and the fourth device is connected to a core network device, and the second device and the third device are respectively connected to the core network device by the fourth device.

The determining that received data is first data by the determining module is specifically determining that data received from a forwarding channel is the first data.

The sending the first data to the first device by the sending module is specifically sending the first data to the first device based on a destination identifier of the first data and/or a terminal device identifier, where the destination identifier of the first data is used to indicate an identifier of a direct sending device for a terminal device receiving the first data, and the terminal device identifier is an identifier of the terminal device receiving the first data.

The determining that received data is first data by the determining module is specifically determining the first data in data received from a child node of the third device, where the child node of the third device is a device that is one-hop farther from the fourth device among devices that are directly connected to the third device.

When the determining module determines that the received data is the first data, the received data includes at least one of the following items: the received data carries a forwarding identifier, the received data carries a plurality of destination identifiers, when uplink data transmitted by the first device to the fourth device does not carry a destination identifier, the received data carries a destination identifier, according to an identifier of a next hop indicated by the mapping relationship, a destination identifier carried in the received data is not an identifier of the child node of the third device sending the data, and a destination identifier carried in the received data is a destination identifier of the third device reachable based on a mapping relationship, and the received data is received from a first path, where the first path is not a path for receiving data of the first device by the third device.

A priority of sending the first data by the sending module is higher than a priority of sending second data by the third device, and the second data is downlink data sent by the fourth device to the first device after switching.

Figure 16:
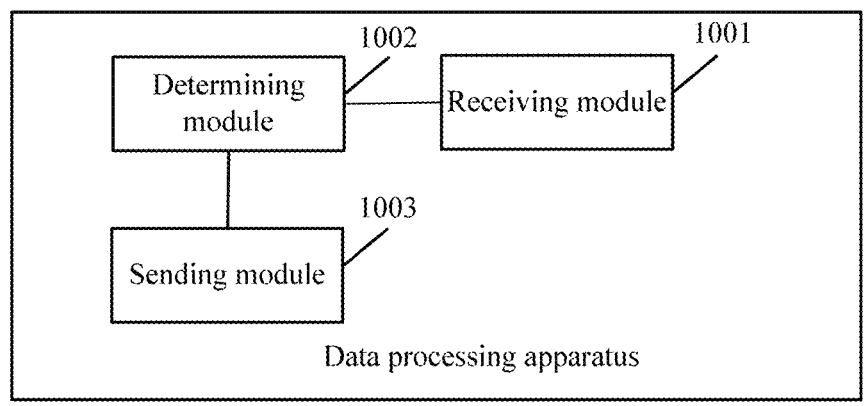
FIG. 16 is a schematic structural diagram of still another data processing apparatus according to an embodiment of the present invention.

FIG. 16 is a schematic structural diagram of still another data processing apparatus according to an embodiment of the present invention. The data processing apparatus may be disposed in a fifth device, and may execute related functions of the fifth device in the foregoing embodiments or implementations. The data processing apparatus is disposed in the fifth device, and the data processing apparatus includes a receiving module 1001, configured to receive data sent by a child node or a parent node of the fifth device, a determining module 1002, configured to determine that the received data is first data, and a sending module 1003, configured to send the first data to the third device, so that the third device sends the first data to the first device.

The first data is data that has been received by the second device but has not been acknowledged as received by the first device, in data sent by the fourth device to the first device through the second device, and the fourth device is connected to a core network device, the second device and the third device are respectively connected to the core network device by the fourth device, and the second device is connected to the third device by at least the fifth device.

The sending the first data to the third device by the sending module is specifically sending the first data to the third device based on a forwarding channel, where the forwarding channel is a channel from the second device to the third device through the fifth device, established by the fourth device by using signaling, and used to forward the first data.

The determining that the received data is first data by the determining module is specifically determining that data received from the forwarding channel is the first data.

The sending the first data to the third device by the sending module is specifically sending the first data to the third device based on a mapping relationship, where the mapping relationship includes a destination identifier of a destination device that can be reached through the fifth device and an identifier of a next hop to the destination device.

The first data carries a destination identifier, and the sending the first data to the third device based on a mapping relationship by the sending module is specifically when an identifier of a next hop to the destination identifier exists in the mapping relationship of the fifth device, sending the first data to a device identified by the next hop, so that the device identified by the next hop sends the first data to the third device, or when an identifier of a next hop to the destination identifier does not exist in the mapping relationship of the fifth device, sending the first data to the parent node of the fifth device, so that a device identified by the next hop sends the first data to the third device, where the parent node of the fifth device is a device that is one-hop closer to the fourth device among devices that are directly connected to the fifth device.

The determining that the received data is first data by the determining module includes when the fifth device is a device on a link between the second device and the fourth device, determining the first data in data received from the child node of the fifth device, or when the fifth device is a device on a link between the third device and the fourth device, determining the first data in data received from the parent node of the fifth device, where the child node of the fifth device is a device that is one-hop farther from the fourth device among the devices that are directly connected to the fifth device, and the parent node of the fifth device is a device that is one-hop closer to the fourth device among the devices that are directly connected to the fifth device.

When the determining module determines that the received data is the first data, the received data includes at least one of the following items the received data carries a forwarding identifier, the received data carries a plurality of destination identifiers, when data transmitted by the first device to the fourth device does not carry a destination identifier, the received data carries a destination identifier, according to the identifier of the next hop indicated by the mapping relationship, a destination identifier carried in the received data is not an identifier of the child node of the fifth device sending the data, and a destination identifier carried in the received data is a destination identifier reachable based on the mapping relationship, and the received data is received from a first path, where the first path is not a path for receiving data of the first device by the third device.

A priority of sending the first data by the sending module is higher than a priority of sending second data by the sending module, and the second data is downlink data sent by the fourth device to the first device after switching.

Figure 17:
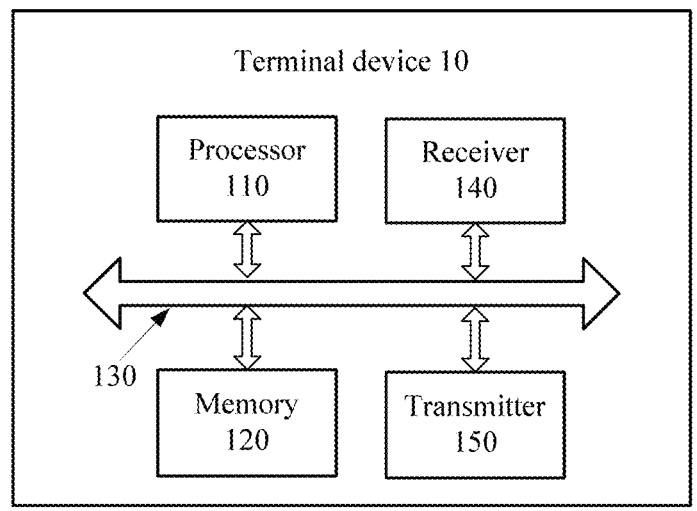
FIG. 17 is a schematic diagram 1 of a device according to an embodiment of this application.

According to the foregoing method, FIG. 17 is a schematic diagram 1 of a device according to an embodiment of this application. As shown in FIG. 17, the device may be a terminal device, or may be a chip or a circuit, for example, may be a chip or a circuit disposed in the terminal device. The terminal device may correspond to the first device or the sixth device in the foregoing method.

The device may include a processor no and a memory 120. The memory 120 is configured to store an instruction, and the processor no is configured to execute the instruction stored in the memory 120, to implement the step of the first device or the second device in the methods corresponding to FIG. 1 to FIG. 8.

Further, the device may further include a receiver 140 and a transmitter 150. Further, the device may further include a bus system 130, and the processor no, the memory 120, the receiver 140, and the transmitter 150 may be connected by the bus system 130.

The processor no is configured to execute the instruction stored in the memory 120, to control the receiver 140 to receive a signal and control the transmitter 150 to transmit a signal to complete steps of the terminal device in the foregoing method. The receiver 140 and the transmitter 150 may be a same physical entity or different physical entities. When the receiver 140 and the transmitter 150 are the same physical entity, they may be collectively referred to as a transceiver. The memory 220 may be integrated in the processor 210, or may be disposed separately from the processor 210.

In an implementation, it may be considered that functions of the receiver 140 and the transmitter 150 are implemented by a transceiver circuit or a dedicated transceiver chip. It may be considered that the processor no is implemented by a dedicated processing chip, a processing circuit, a processor, or a general purpose chip.

In another implementation, it may be considered that the terminal device provided by this embodiment of this application is implemented by using a general purpose computer. To be specific, program code of functions of the processor no, the receiver 140, and the transmitter 150 is stored in the memory, and the general purpose processor implements the functions of the processor no, the receiver 140, and the transmitter 150 by executing the code in the memory.

For concepts, explanations, and detailed descriptions related to the technical solution provided by this embodiment of this application in the device, and other steps, refer to descriptions about the content in the foregoing method or other embodiments. Details are not described again herein.

Figure 18:
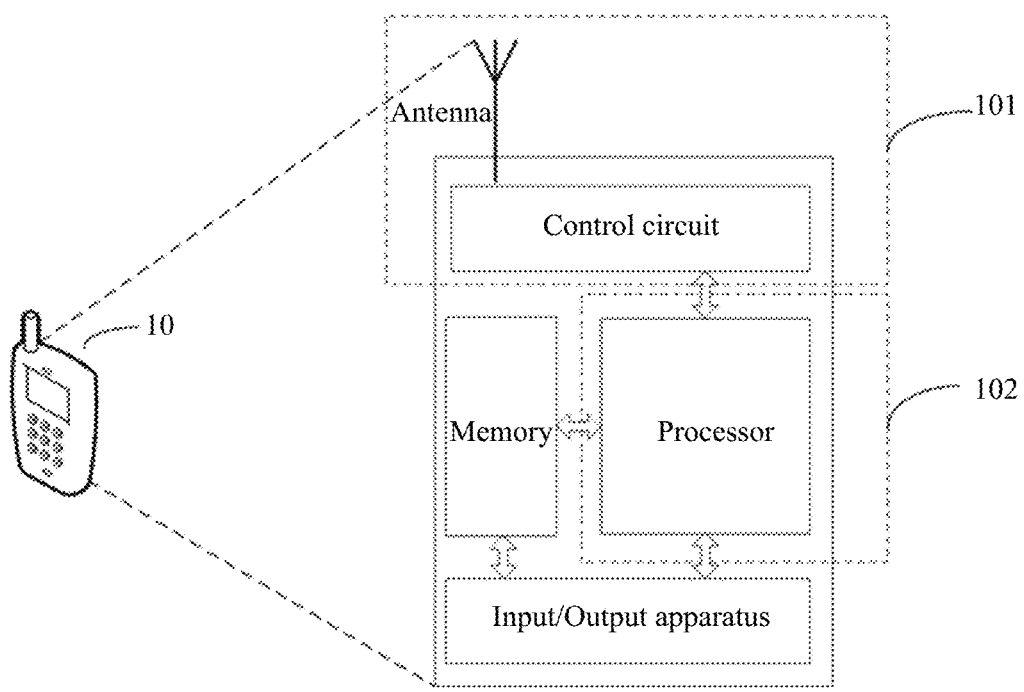
FIG. 18 is a schematic structural diagram of a terminal device according to an embodiment of this application.

FIG. 18 is a schematic structural diagram of a terminal device according to this application. The terminal device may be applied to a system shown in FIG. 1. For ease of description, FIG. 8 shows only main parts of the terminal device. As shown in FIG. 18, the terminal device 10 includes a processor, a memory, a control circuit, an antenna, and an input/output apparatus. The processor is mainly configured to perform processing on a communication protocol and communication data, and perform control on the whole terminal device, execute a software program, and process data of the software program, for example, configured to support the terminal device in performing actions described in the related embodiment of the foregoing data processing method. The memory is mainly configured to store the software program and data, for example, store any one or more of the downlink data and the first data described in the foregoing embodiment. The control circuit is mainly configured to perform conversion between a baseband signal and a radio frequency signal and processing on a radio frequency signal. The control circuit and the antenna may also be collectively referred to as a transceiver, and are mainly configured to transmit or receive a radio frequency signal in a form of an electromagnetic wave. The input/output apparatus, for example, a touchscreen, a display screen, or a keyboard, is mainly configured to receive data input by a user and output data to the user.

After the terminal device is powered on, the processor may read the software program in the storage unit, interpret and execute the instruction of the software program, and process data of the software program. When data needs to be transmitted in a wireless manner, after performing baseband processing on the to-be-transmitted data, the processor outputs a baseband signal to a radio frequency circuit, and the radio frequency circuit performs radio frequency processing on the baseband signal, and transmits the radio frequency signal in a form of an electromagnetic wave by using the antenna. When data is transmitted to the terminal device, the radio frequency circuit receives a radio frequency signal by using the antenna, converts the radio frequency signal into a baseband signal, and outputs the baseband signal to the processor, and the processor converts the baseband signal into data, and performs processing on the data.

A person skilled in the art may understand that, for ease of description, FIG. 18 shows only one memory and one processor. In an actual terminal device, a plurality of processors and memories may exist. The memory may also be referred to as a storage medium or a storage device, or the like. This is not limited in this embodiment of the present invention.

In an optional implementation, the processor may include a baseband processor and a central processing unit. The baseband processor is mainly configured to perform processing on the communication protocol and the communication data, and the central processing unit is mainly configured to perform control on the whole terminal device, to execute the software program and process the data of the software program. The processor in FIG. 18 integrates functions of the baseband processor and the central processing unit. A person skilled in the art may understand that, the baseband processor and the central processing unit may also be independent processors, and are interconnected by using a technology such as a bus. A person skilled in the art may understand that, the terminal device may include a plurality of baseband processors to adapt to different network standards. The terminal device may include a plurality of central processing units to enhance processing capabilities of the terminal device. The parts of the terminal device may be connected by using various buses. The baseband processor may also be expressed as a baseband processing circuit or a baseband processing chip. The central processing unit may also be expressed as a central processing circuit or a central processing chip. Functions for processing the communication protocol and communication data may be built in the processor, or may be stored in the storage unit in a form of a software program. The processor executes the software program to implement a baseband processing function.

For example, in this embodiment of the present invention, the antenna and the control circuit that have transmitting and receiving functions may be considered as a transceiver unit 101 of the terminal device 10, and the processor having a processing function may be considered as a processing unit 102 of the terminal device 10. As shown in FIG. 8, the terminal device 10 includes a transceiver unit 101 and a processing unit 102. The transceiver unit may also be referred to as a transceiver, a transceiver device, a transceiver apparatus, or the like. Optionally, a component configured to implement a receiving function in the transceiver unit 101 may be considered as a receiving unit, and a component configured to implement a transmitting function in the transceiver unit 101 may be considered as a sending unit. To be specific, the transceiver unit 101 includes a receiving unit and a sending unit. For example, the receiving unit may also be referred to as a receiving device, a receiver, a receiving circuit, or the like, and the sending unit may be referred to as a transmitting device, a transmitter, a transmitting circuit, or the like.

Figure 19:
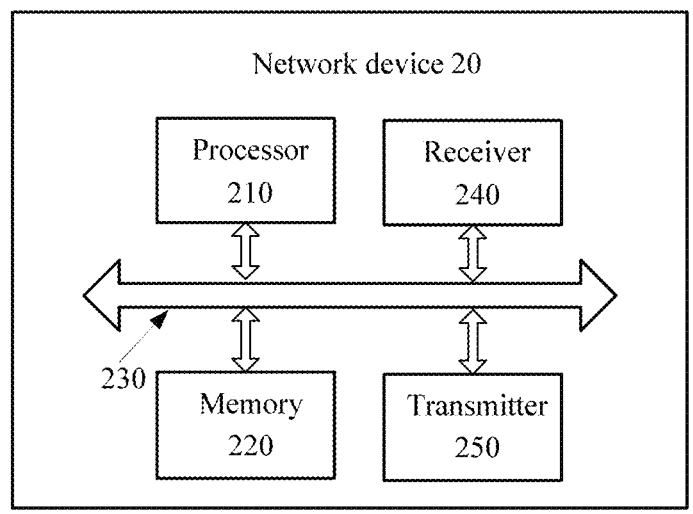
FIG. 19 is a schematic diagram 2 of a network device according to an embodiment of this application.

According to the foregoing method, FIG. 19 is a schematic diagram 2 of a network device according to an embodiment of this application. As shown in FIG. 19, the network device may be a first device and/or a second device, or may be a chip or a circuit, for example, may be a chip or a circuit disposed in the network device. The network device 20 corresponds to the network device in the foregoing method. The device may include a processor 210 and a memory 220. The memory 220 is configured to store an instruction, and the processor 210 is configured to execute the instruction stored in the memory 220, so that the network device implements related functions of the first device, the second device, the third device, the fourth device, and the fifth device in the methods corresponding to FIG. 1 to FIG. 8.

Further, the network device may further include a receiver 240 and a transmitter 250. Still further, the network device may further include a bus system 230.

The processor 210, the memory 220, the receiver 240, and the transmitter 250 are connected by the bus system 230. The processor 210 is configured to execute the instruction stored in the memory 220 to control the receiver 240 to receive a signal and control the transmitter 250 to transmit a signal to complete steps of the network device in the foregoing method. The receiver 240 and the transmitter 250 may be a same physical entity or different physical entities. When the receiver 240 and the transmitter 250 are the same physical entity, they may be collectively referred to as a transceiver. The memory 220 may be integrated in the processor 210, or may be disposed separately from the processor 210.

In an implementation, it may be considered that functions of the receiver 240 and the transmitter 250 are implemented by a transceiver circuit or a dedicated transceiver chip. It may be considered that the processor 210 is implemented by a dedicated processing chip, a processing circuit, a processor, or a general purpose chip.

In another implementation, it may be considered that the network device provided by this embodiment of this application is implemented by using a general purpose computer. To be specific, program code of functions of the processor 210, the receiver 240, and the transmitter 250 is stored in the memory, and the general purpose processor implements the functions of the processor 210, the receiver 240, and the transmitter 250 by executing the code in the memory.

For concepts, explanations, and detailed descriptions related to the technical solution provided by this embodiment of this application in the device, and other steps, refer to descriptions about the content in the foregoing method or other embodiments. Details are not described again herein.

Figure 20:
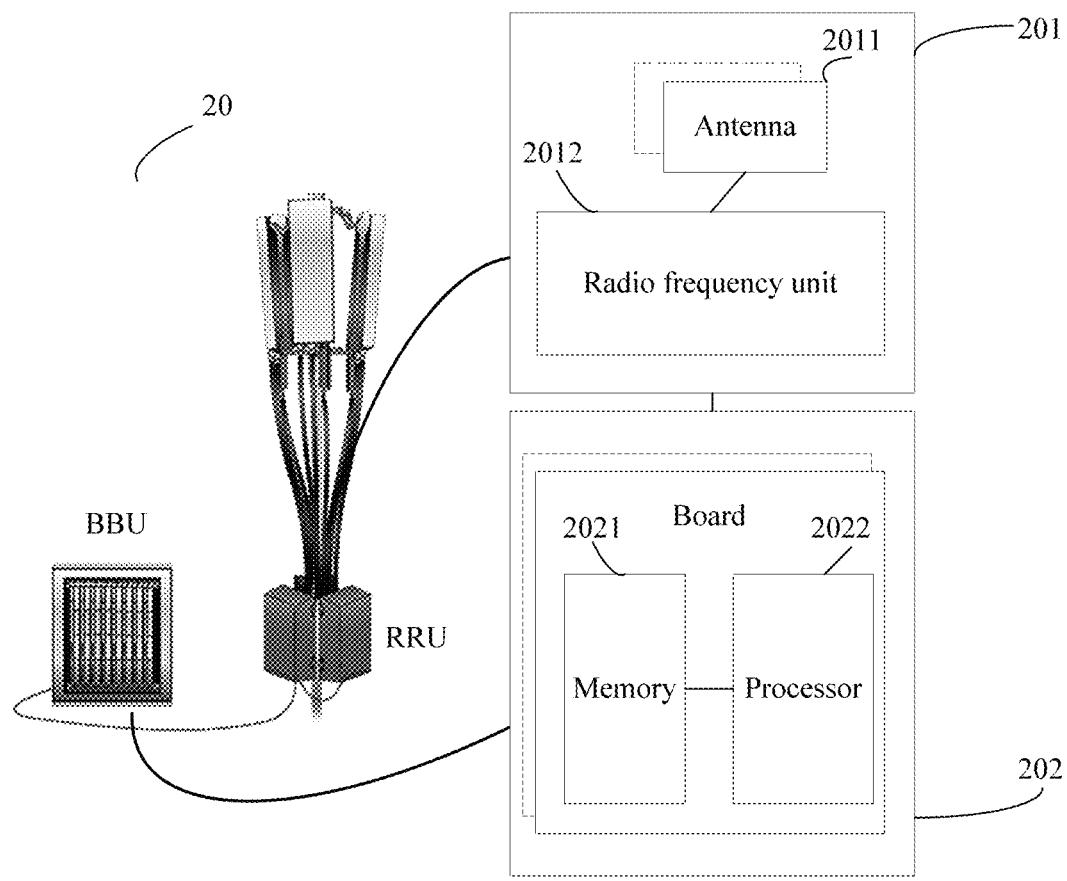
FIG. 20 is a schematic structural diagram of a base station according to an embodiment of this application.

According to the foregoing method, FIG. 20 is a schematic structural diagram of a base station according to an embodiment of this application, for example, a schematic structural diagram of a base station. As shown in FIG. 20, the base station may be applied to a system shown in FIG. 1, FIG. 2, or FIG. 3. The base station 20 includes one or more radio frequency units, for example, a remote radio unit (RRU) 201 and one or more baseband units (BBU) (which may also be referred to as a digital unit (DU)) 202. The RRU 201 may be referred to as a transceiver unit, a transceiver device, a transceiver circuit, a transceiver, or the like, and the RRU 201 may include at least one antenna 2011 and a radio frequency unit 2012. The RRU 201 part is mainly configured to transmit or receive a radio frequency signal and perform conversion between a radio frequency signal and a baseband signal, for example, configured to send a first message, a status message, first data, or the like. The BBU 202 part is mainly configured to perform baseband processing, and perform control on the base station, or the like. The RRU 201 and the BBU 202 may be disposed together physically, or may be disposed separately physically, that is, used as a distributed base station.

The BBU 202 is a control center of the base station, and may also be referred to as a processing unit. The BBU 202 is mainly configured to implement a baseband processing function, for example, channel coding, multiplexing, modulation, spectrum spreading, or the like. For example, the BBU (processing unit) may be configured to control the base station to perform the operation procedure of the network device in the foregoing method embodiment.

In an example, the BBU 202 may include one or more boards, where the plurality of boards may jointly support a radio access network (such as an LTE network) of a single access mode, or may respectively support radio access networks of different access modes. The BBU 202 may further include a memory 2021 and a processor 2022. The memory 2021 is configured to store a necessary instruction and data. For example, the memory 2021 stores the mapping relationship in the foregoing embodiment. The processor 2022 is configured to control the base station to perform a necessary action, for example, configured to control the base station to perform the operation procedure of the network device in the foregoing method embodiment. The memory 2021 and the processor 2022 may serve one or more boards. To be specific, a memory and a processor may be disposed on each board, or a same memory and a same processor may be shared by a plurality of boards. In addition, a necessary circuit may be disposed on each board.

According to the method provided by the embodiment of this application, an embodiment of this application further provides a communications system, including one or more of the foregoing network devices and one or more of the foregoing terminal devices.

It should be understood that in the embodiment of this application, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described again herein.

It should also be understood that, the terms "first", "second", "third", "fourth", and various numbers in this specification are used for distinguishing for ease of description only, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks described in the embodiments disclosed in this specification and steps, the functions may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method, comprising:
determining, by a second device, in response to a first device switching from the second device to a third device, data receiving status information of the first device; and
reporting, by the second device, to a parent node of the second device, the data receiving status information of the first device according to a maintained mapping relationship, wherein the maintained mapping relationship is a correspondence between a data packet number of data sent by the second device to the first device and a data packet number of data received from the parent node of the second device, wherein the reporting the data receiving status information of the first device comprises sending, by the second device, in response to at least one device existing on a link between the second device and a fourth device, a first status message to the parent node of the second device, the first status message causing the parent node of the second device to report the data receiving status information of the first device to the fourth device based on the first status message, wherein the first status message carries the data receiving status information of the first device, and wherein the data receiving status information instructs the fourth device to send data to the first device according to the data receiving status information.

2. The method according to claim 1, wherein the data receiving status information indicates, in data sent by the fourth device to the first device through the second device, information about data that has been received by the second device but has not been acknowledged as received by the first device.

3. The method according to claim 1, wherein the fourth device is connected to a core network device, and the second device and the third device are respectively connected to the core network device by the fourth device.

4. The method according to claim 1, wherein the parent node of the second device is a device that is one-hop closer to the fourth device than the second device among devices that are directly connected to the second device.

5. The method according to claim 4, wherein the sending the first status message to the parent node of the second device comprises:
sending, by the second device, the first status message to the parent node of the second device wherein the data packet number of data sent by the second device is a Packet Data Convergence Protocol (PDCP) layer count value of the data sent by the second device.

6. A device, comprising:
a communications interface;
a processor; and
a non-transitory computer-readable storage medium storing a program to be executed by the processor, the program including instructions to:
determine data receiving status information of a first device in response to the first device switching from the device to a third device; and
cause the communications interface to report, to a parent node of the device, the data receiving status information of the first device according to a maintained mapping relationship, wherein the maintained mapping relationship is a correspondence between a data packet number of data sent by the device to the first device and a data packet number of data received from the parent node of the device, wherein the instructions to cause the communications interface to report the data receiving status information of the first device include instructions to send a first status message to the parent node of the device, the first status message causing the parent node of the device to report the data receiving status information of the first device to a fourth device according to the first status message, wherein the first status message carries the data receiving status information of the first device, and wherein the data receiving status information instructs the fourth device to send data to the first device according to the data receiving status information.

7. The device according to claim 6, wherein the data receiving status information indicates, in data sent by the fourth device to the first device through the device, information about data that has been received by the device but has not been acknowledged as received by the first device.

8. The device according to claim 6, wherein the fourth device is connected to a core network device, and wherein the device and the third device are respectively connected to the core network device by the fourth device.

9. The device according to claim 6, wherein the parent node of the device is a device that is one-hop closer than the device to the fourth device among devices that are directly connected to the device.

10. The device according to claim 9, wherein the instructions to send the first status message to the parent node include instructions to:
send the first status message to the parent node of the device, wherein the data packet number of data sent by the device is a Packet Data Convergence Protocol (PDCP) layer count value of the data sent by the device.

11. A non-transitory computer-readable storage medium, wherein the computer-readable storage medium stores program code for execution by a processor, the program including instructions for:
determining, by a second device, in response to a first device switching from the second device to a third device, data receiving status information of the first device; and reporting, by the second device, to a parent node of the second device, the data receiving status information of the first device according to a maintained mapping relationship, wherein the maintained mapping relationship is a correspondence between a data packet number of data sent by the second device to the first device and a data packet number of data received from the parent node of the second device, wherein the instructions for reporting the data receiving status information of the first device include instructions for sending, by the second device, in response to at least one device existing on a link between the second device and a fourth device, a first status message to the parent node of the second device, the first status message causing the parent node of the second device to report the data receiving status information of the first device to the fourth device according to the first status message, wherein the first status message carries the data receiving status information of the first device, and wherein the data receiving status information instructs the fourth device to send data to the first device according to the data receiving status information.

12. The non-transitory computer-readable storage medium according to claim 11, wherein the data receiving status information indicates, in data sent by the fourth device to the first device through the second device, information about data that has been received by the second device but has not been acknowledged as received by the first device.

13. The computer-readable storage medium according to claim 11, wherein the fourth device is connected to a core network device, and wherein the second device and the third device are respectively connected to the core network device by the fourth device.

14. The computer-readable storage medium according to claim 11, wherein the parent node of the second device is a device that is one-hop closer than the second device to the fourth device among devices that are directly connected to the second device.

15. The computer-readable storage medium according to claim 14, wherein the instructions for sending the first status message to the parent node include instructions for:
  sending, by the second device, the first status message to the parent node of the second device, wherein the data packet number of data sent by the second device is a Packet Data Convergence Protocol (PDCP) layer count value of the data sent by the second device.

* * * * *